(12) United States Patent
Maeda

(10) Patent No.: US 9,141,306 B2
(45) Date of Patent: Sep. 22, 2015

(54) INFORMATION PROCESSING APPARATUS AND AREA RELEASE CONTROL METHOD

(71) Applicant: FUJITSU LIMITED, Kawasaki-shi, Kanagawa (JP)

(72) Inventor: Jun Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 13/951,545

(22) Filed: Jul. 26, 2013

(65) Prior Publication Data

US 2014/0068213 A1    Mar. 6, 2014

(30) Foreign Application Priority Data

Aug. 30, 2012   (JP) .................................. 2012-190477

(51) Int. Cl.
| | |
|---|---|
| G06F 12/00 | (2006.01) |
| G06F 3/06 | (2006.01) |
| G06F 12/06 | (2006.01) |
| G06F 12/02 | (2006.01) |

(52) U.S. Cl.
CPC .............. *G06F 3/0655* (2013.01); *G06F 3/065* (2013.01); *G06F 3/0608* (2013.01); *G06F 3/0619* (2013.01); *G06F 3/0644* (2013.01); *G06F 3/0673* (2013.01); *G06F 3/0689* (2013.01); *G06F 12/02* (2013.01); *G06F 12/0223* (2013.01); *G06F 12/06* (2013.01)

(58) Field of Classification Search
CPC ..... G06F 12/02; G06F 12/0223; G06F 12/06; G06F 3/0655; G06F 3/0673; G06F 3/0619
See application file for complete search history.

(56) References Cited

U.S. PATENT DOCUMENTS

2008/0120459 A1    5/2008    Kaneda et al.

FOREIGN PATENT DOCUMENTS

| JP | 2008-130080 | 6/2008 |
|---|---|---|
| JP | 2011-76572 | 4/2011 |

*Primary Examiner* — Shawn X Gu
(74) *Attorney, Agent, or Firm* — Fujitsu Patent Center

(57) ABSTRACT

An information processing apparatus includes a controller. The controller performs a transfer source information generation process for generating transfer source information upon reception of an offload data transfer instruction from a host computer. The controller performs a reserved state setting process for setting, when an instruction to release a release area is received, an overlapping area to a reserved state so as to reserve release of the overlapping area, after issuing a completion response for the release instruction. The controller performs a pending state determination process for determining a pending state in which data transfer using the transfer information might be executed. The controller performs an area release process for releasing the overlapping area which is set to the reserved state and thus is reserved to be released, when the pending state is cancelled.

12 Claims, 20 Drawing Sheets

INFORMATION PROCESSING APPARATUS AND AREA RELEASE CONTROL METHOD

CROSS-REFERENCE TO RELATED APPLICATION

This application is based upon and claims the benefit of priority of the prior Japanese Patent Application No. 2012-190477, filed on Aug. 30, 2012, the entire contents of which are incorporated herein by reference.

FIELD

The embodiments discussed herein are related to an information processing apparatus and an area release control method.

BACKGROUND

There is a storage apparatus that causes its host computer to identify a virtual volume (logical volume), and allocates storage resources from a storage pool to the logical volume when needed. The storage device releases an area that is no longer needed, and returns its storage resources to the storage pool.

In this way, the storage apparatus effectively uses the resources therein.

Meanwhile, an offload data transfer function has been disclosed. The offload data transfer function is for offloading tasks, such as copying and moving files, from a host computer to a storage apparatus, and thereby reducing the central processing unit (CPU) load of the host computer and the communication load between the host computer and the storage apparatus (see, for example, Japanese Laid-open Patent Publications No. 2008-130080 and No. 2011-76572).

If an area release is accepted during execution of the offload data transfer function, the storage apparatus might lose data to be transferred by the offload data transfer. To prevent such data loss, the storage apparatus needs to save data to a saving volume from the area to be released.

However, saving data to the saving volume consumes significant time and memory resources, and therefore is an inefficient solution.

SUMMARY

According to one aspect of the invention, there is provided an information processing apparatus that includes: a memory configured to store a received offload data transfer instruction; and one or more processors. The one or more processors are configured to perform a procedure including: generating transfer source information regarding a transfer source area in accordance with the offload data transfer instruction; setting, when a release instruction to release an area overlapping the transfer source area is received, the area to a reserved state so as to reserve release of the area, after issuing a completion response for the release instruction; determining a pending state in which data transfer using the transfer source information is pending; and releasing the area in the reserved state, when the pending state is cancelled.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
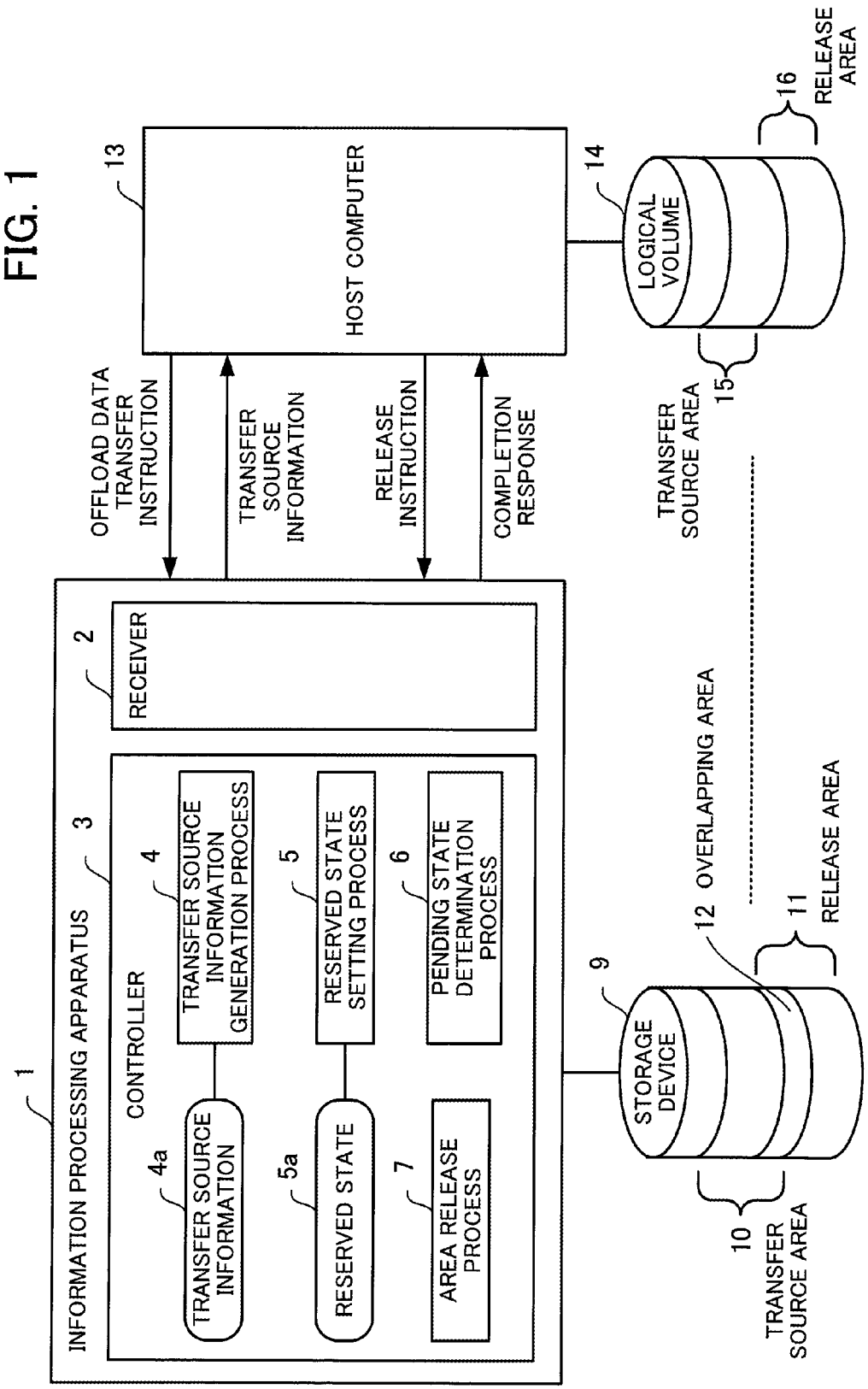
FIG. 1 illustrates an exemplary configuration of an information processing apparatus according to a first embodiment.

Several embodiments will be described below with reference to the accompanying drawings, wherein like reference numerals refer to like elements throughout.

(a) First Embodiment

First, an information processing apparatus 1 according to a first embodiment will be described with reference to FIG. 1. FIG. 1 illustrates an exemplary configuration of the information processing apparatus 1 according to the first embodiment.

The information processing apparatus 1 is a control apparatus that performs access control for a storage device (memory device) 9. The information processing apparatus 1 and the storage device 9 together form a storage apparatus. The storage device 9 is capable of recording data that are needed. Examples of the storage device 9 include hard disk drive (HDD), solid state drive (SSD) (flash memory drive), and the like.

The information processing apparatus 1 is communicably connected to a host computer 13. The host computer 13 provides a server function to an operation terminal (not illustrated), for example. The information processing apparatus 1 receives instructions (offload data transfer instruction, release instruction, I/O (Input/Output) command, and the like) from the host computer 13. The offload data transfer instruction is a command for transferring data, using a token, within a storage apparatus or between storage apparatuses, without causing the host computer 13 to read or write the transfer target data. Note that a token is control information regarding data transfer. Data transfer involves copying and moving data. The data may be transferred in arbitrary units, such as in units of files, in units of volumes, and the like. A release instruction is a command to release the storage device 9 allocated to a logical volume 14.

The information processing apparatus 1 includes a receiver 2 and a controller 3. The receiver 2 receives commands, such as an offload data transfer instruction, a release instruction, and the like, from the host computer 13. The controller 3 performs a transfer source information generation process 4, a reserved state setting process 5, a pending state determination process 6, and an area release process 7.

The transfer source information generation process 4 is a process for generating transfer source information 4a regarding a transfer source area 10 of the storage device 9 in accordance with an offload data transfer instruction received from the host computer 13. The host computer 13 transmits information indicating a transfer source area 15 of the logical volume 14, together with the offload data transfer instruction. In the transfer source information generation process 4, the information processing apparatus 1 identifies the transfer source area 10 corresponding to the transfer source area 15, and generates the transfer source information 4a. The transfer source information 4a contains information indicating a transfer source specified by the offload data transfer instruction. The transfer source information 4a may be information called a token, for example.

The reserved state setting process 5 is a process for setting, in the case where an instruction (release instruction) to release a release area 11 that includes an overlapping area which overlaps the transfer source area 10 is received, an overlapping area 12 to a reserved state 5a so as to reserve release of the overlapping area 12, after issuing a completion response for the release instruction. Note that a release of the release area 11 that includes the overlapping area 12 may be reserved. The host computer 13 transmits information indicating a release area 16 of the logical volume 14, together with the release instruction. In the reserved state setting process 5, the information processing apparatus 1 identifies the release area 11 corresponding to the release area 16, and identifies the overlapping area 12 which overlaps the transfer source area 10.

The pending state determination process 6 is a process for determining a pending state. The pending state is a state in which data transfer using the transfer source information 4a is pending. The state in which data transfer is pending is a state in which data transfer using the transfer source information 4a might be executed. That is, when the data transfer using the transfer source information 4a is in the pending state, the information processing apparatus 1 needs to hold data in the transfer source area 10 so as to prepare for this data transfer.

The area release process 7 is a process for releasing the overlapping area 12 (the area in a reserved state) which is set to the reserved state 5a and which is thereby reserved to be released, when the pending state is cancelled.

Thus, the information processing apparatus 1 may release the overlapping area 12 asynchronously with the release instruction. Further, since the information processing apparatus 1 does not release the overlapping area 12 until the pending state is canceled, it is possible to hold the data in the overlapping area 12 so as to prepare for the data transfer using the transfer source information 4a. In this way, the information processing apparatus 1 may prepare for data transfer using the transfer source information 4a without saving data from the overlapping area 12 to a saving area. Therefore, the information processing apparatus 1 does not need time or resources, such as memory areas and the like, to save data. Thus, the information processing apparatus 1 makes it possible to improve the resource use efficiency at the time of area release while executing an offload data transfer function.

(b) Second Embodiment

Figure 2:
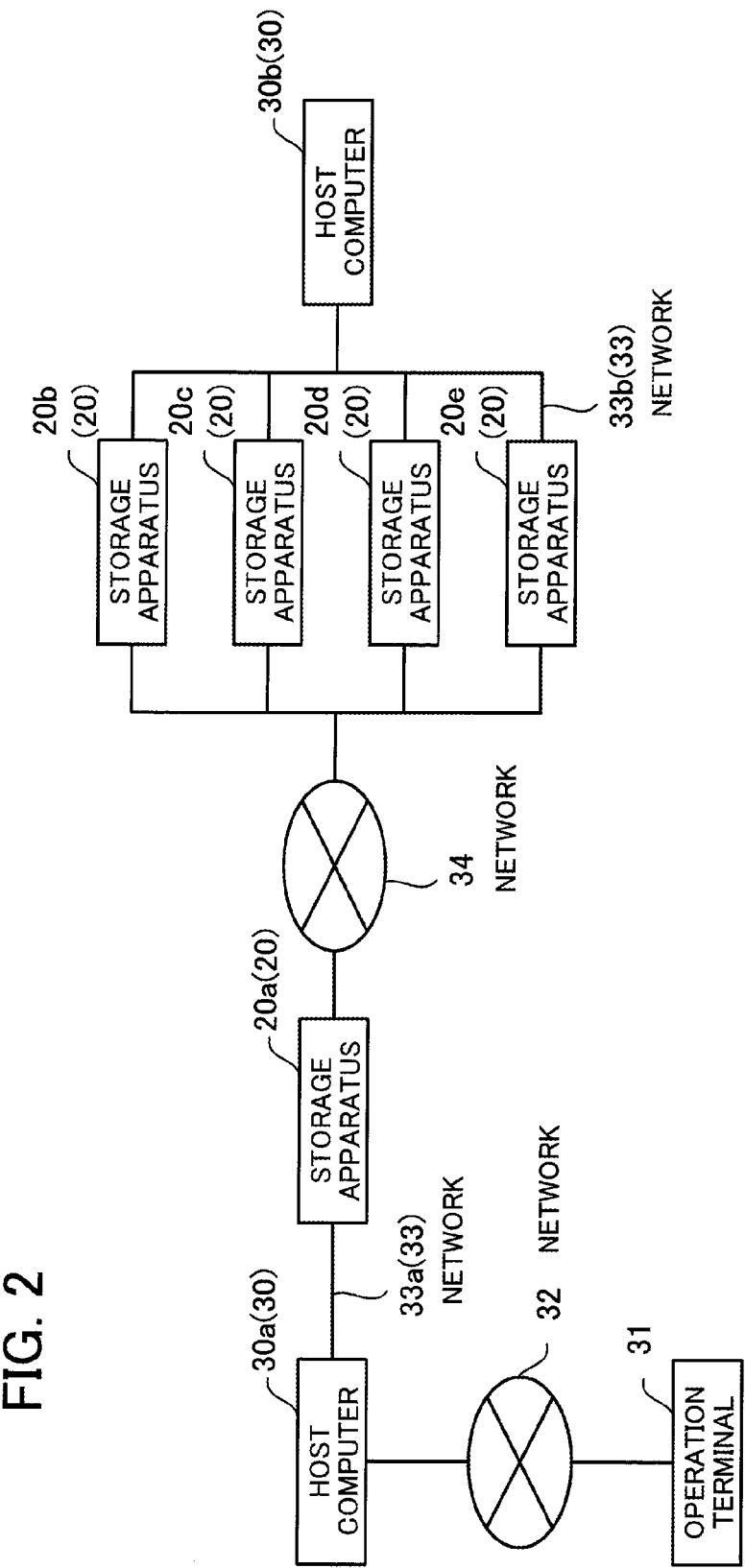
FIG. 2 illustrates an example of connection of storage apparatuses according to a second embodiment.

Next, an example of connection of storage apparatuses 20 according to a second embodiment will be described with reference to FIG. 2. FIG. 2 illustrates an example of connection of the storage apparatuses 20 according to the second embodiment.

The storage apparatuses 20 are communicably connected to host computers 30 via networks 33. The network 33 is a storage area network (SAN) to which one or more of the storage apparatuses 20 and one or more of the host computers 30 are connected.

The storage apparatus 20a is communicably connected to the host computer 30a via the network 33a. The storage apparatuses 20b, 20c, 20d, and 20e are communicably connected to the host computer 30b via the network 33b. Further, the storage apparatuses 20a, 20b, 20c, 20d, and 20e are communicably connected via a network 34. The network 34 is a dedicated network for storage apparatuses.

The host computer 30a is communicably connected to an operation terminal 31 via a network 32. The network is a local area network (LAN) or a wide area network (WAN) to which one or more of the host computers 30 and one or more operation terminals 31 are connected.

Each storage apparatus 20 may perform a local copy within a storage device controlled by the storage apparatus 20, and may perform a remote copy to an arbitrary storage apparatus 20. The host computer 30 may instruct an arbitrary storage apparatus 20 to perform a local copy or a remote copy. When instructing an arbitrary storage apparatus 20 to perform a local copy or a remote copy, the host computer 30 may instruct an offload data transfer.

Figure 3:
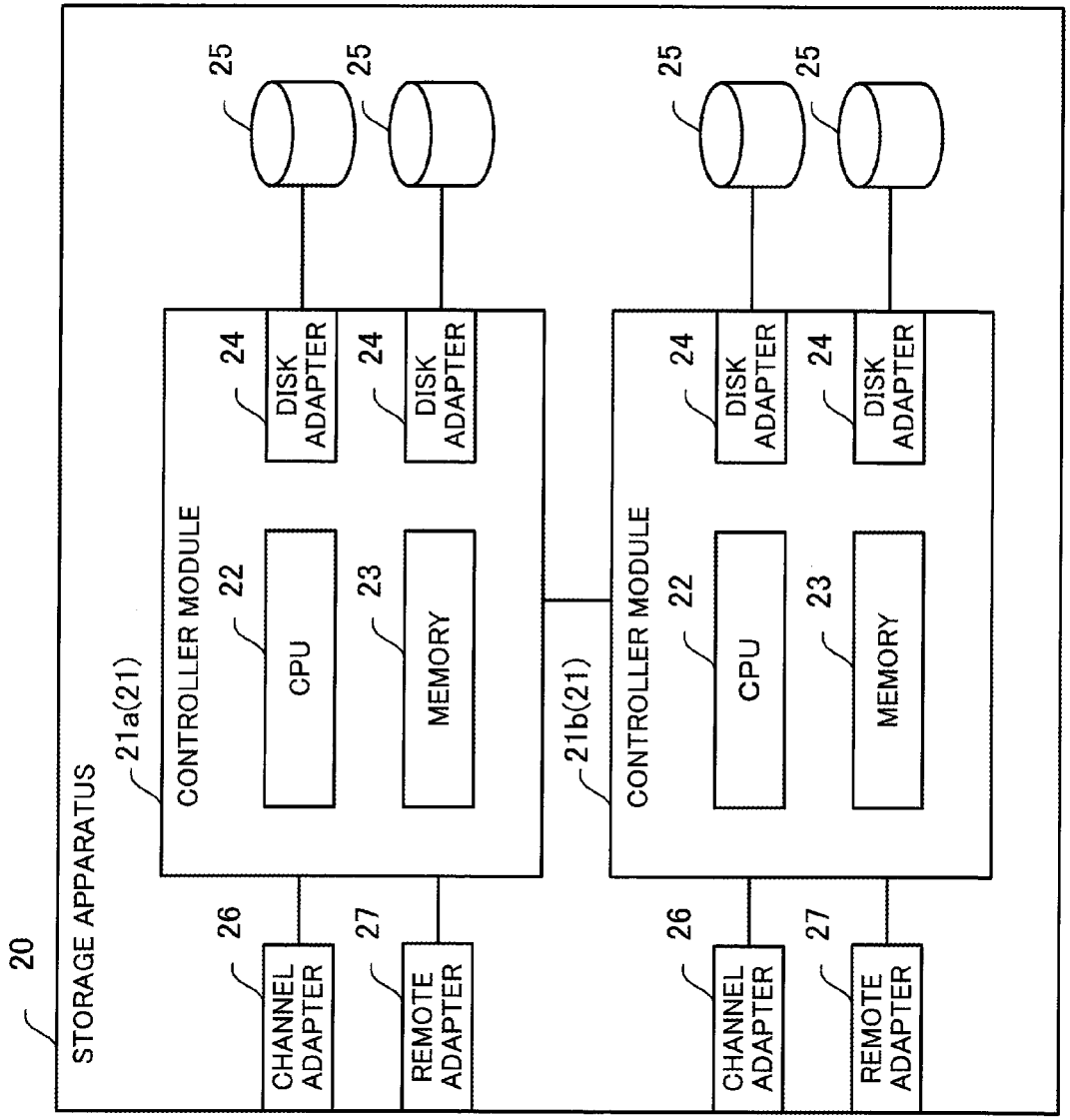
FIG. 3 illustrates an exemplary configuration of the storage apparatus according to the second embodiment.

Next, the storage apparatus 20 according to the second embodiment will be described with reference to FIG. 3. FIG. 3 illustrates an exemplary configuration of the storage apparatus 20 according to the second embodiment.

The storage apparatus 20 includes channel adapters 26, remote adapters 27, controller modules 21, and storage devices 25. The plurality of storage devices 25 form a redundant array of inexpensive disks (RAID). The storage devices 25 store user data and control information (a below-described session management table and the like).

Each controller module 21 is an information processing apparatus that performs access control for the storage devices 25. The access control for the storage devices 25 performed by the controller module 21 includes data transfer control for controlling data transfer from the storage devices 25 and data transfer to the storage devices 25.

The storage apparatus 20 includes two controller modules 21, which are a controller module 21a and a controller module 21b. Each of the controller modules 21a and 21b is connected to the storage devices 25 controlled thereby via disk adapters 24. The controller module 21a and the controller module 21b are connected to each other.

Although the storage apparatus 20 includes two controller modules 21, the embodiment is not limited thereto. The storage apparatus 20 may include either one of the controller modules 21a and 21b. Alternatively, the storage apparatus 20a may include three or more controller modules 21. For example, the storage apparatus 20a may include four or eight controller modules 21.

The storage apparatus 20 is connected to the host computer 30 for communication therewith via the channel adapters 26. The channel adapter 26 is provided for each controller module 21. The controller module 21 may include a plurality of (two, for example) channel adapters 26, and may be connected to the host computer 30 via a plurality of channels by the plurality of channel adapters 26.

The storage apparatus 20 is connected to the other storage apparatuses 20 via the remote adapters 27. The remote adapter 27 is provided for each controller module 21.

The controller module 21 includes a CPU 22, a memory 23, and the disk adapters 24. The CPU 22 performs transfer control, area allocation control, area release control, and the like.

The memory 23 holds data when the data are read from the storage device 25, and serves as a buffer when data are written to the storage device 25. Further, the memory 23 stores user data and control information. The disk adapter 24 performs interface control (access control) for the storage device 25.

The storage apparatus 20 having the configuration described above may control transfer of data in the storage devices 25 controlled by the controller modules 21.

Note that the entire operation of the controller module 21 is controlled by the CPU 22. The memory 23 is connected to the CPU 22 via a bus (not illustrated). Further, peripheral devices (not illustrated) are connected or may be connected to the CPU 22 via a bus (not illustrated). The CPU 22 is an example of a processor, and may be a micro processing unit (MPU), a digital signal processor (DSP), an application specific integrated circuit (ASIC), or a programmable logic device (PLD), for example. The CPU 22 is not limited to a single processor, and may be a multiprocessor. Alternatively, the CPU 22 may be a combination of two or more of the elements selected from CPU, MPU, DSP, ASIC, and PLD.

The memory 23 includes random access memory (RAM) and a non-volatile memory. The RAM serves as a primary storage device of the controller module 21. The RAM temporarily stores at least part of an operating system (OS) program, firmware, and application programs that are executed by the CPU 22. The RAM also stores various types of data that are used for processing by the CPU 22.

The non-volatile memory retains stored data even when power of the storage apparatus 20 is removed. Examples of non-volatile memories include semiconductor memory devices, such as EEPROM and flash memory, HDD, and the like. The non-volatile memory serves as a secondary storage device of the controller module 21. The non-volatile memory stores the OS program, firmware, application programs, and various types of data.

Examples of peripheral devices connected to the bus include an input and output interface and a communication interface.

The input and output interface is connected to an input and output device, such as the HDD and the like, so as to perform input and output operations. The input and output interface transmits signals and data transmitted from storage devices, such as the HDD and the like, to the CPU 22 and a cache memory (the memory 23). Further, the input and output interface outputs signals received from the CPU 22, to other controllers and output devices connected to the controller module 21.

The communication interface transmits data to and receives data from the other controller module 21 in the storage apparatus 20.

With the hardware configuration described above, it is possible to realize the processing functions of the controller module 21 of the second embodiment. Note that not only the host computer 30, but also the information processing apparatus 1 of the first embodiment may be realized with a hardware configuration similar to that of the controller module 21.

Figure 4:
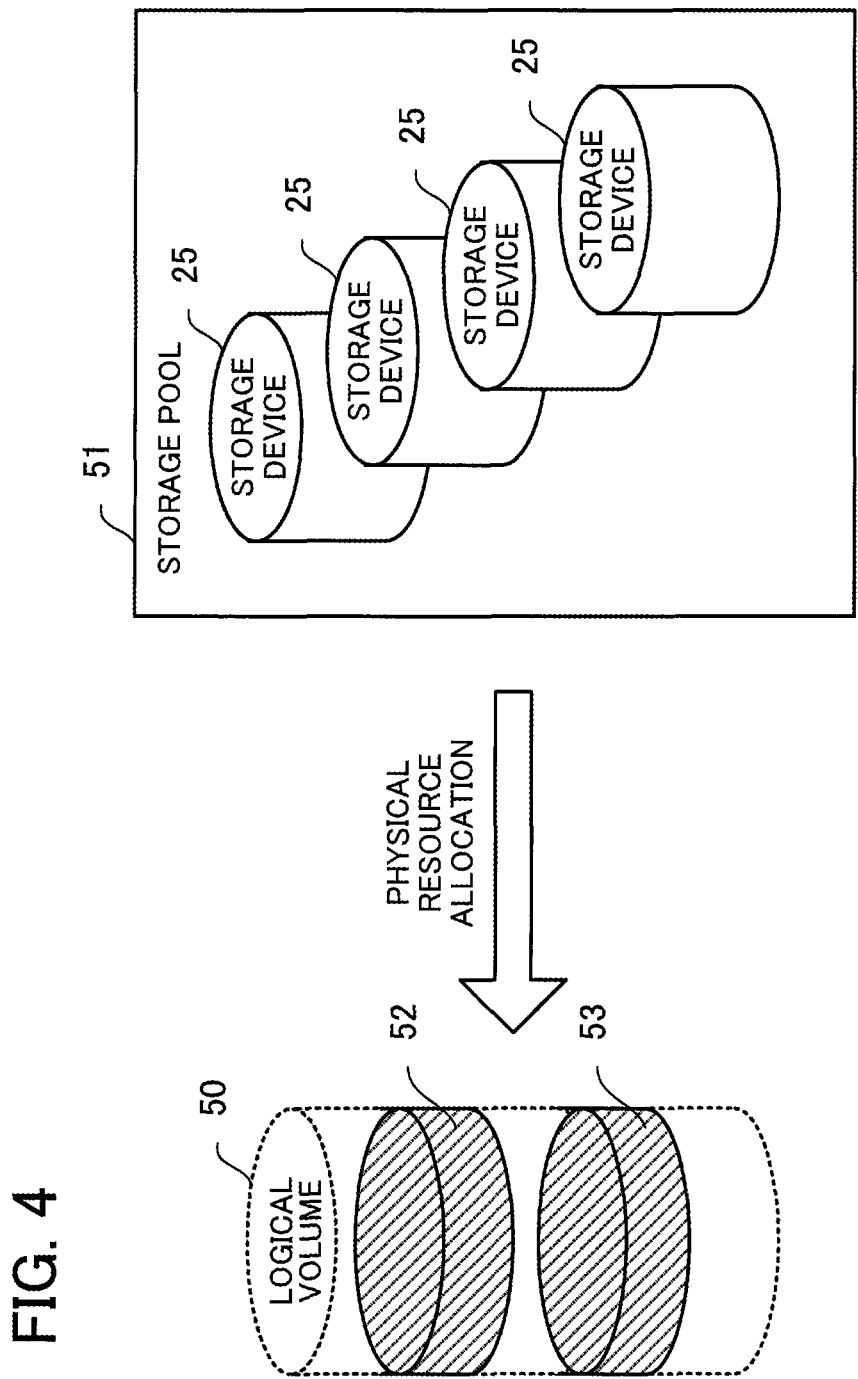
FIG. 4 illustrates allocation of physical resources to a logical volume according to the second embodiment.

Next, area allocation (physical resource allocation) and area release (physical resource release) according to the second embodiment will be described with reference to FIGS. 4 and 5. FIG. 4 illustrates allocation of physical resources to a logical volume 50 according to the second embodiment.

The storage apparatus 20 has a thin provisioning function that may set the amount of available virtual space regardless of the amount of physical space of the storage devices 25. The storage apparatus 20 causes the host computer 30 to identify the logical volume 50, which is a virtual volume. When a Write I/O is issued from the host computer 30, the storage apparatus 20 executes physical resource allocation (area allocation) for allocating storage resources from a storage pool 51 to the logical volume 50. The storage pool 51 is a set of a plurality of storage devices 25 that are managed by the storage apparatus 20. For example, the logical volume 50 illustrated in FIG. 4 receives a Write I/O for areas 52 and 53, and receives physical resource allocation from the storage pool 51.

Figure 5:
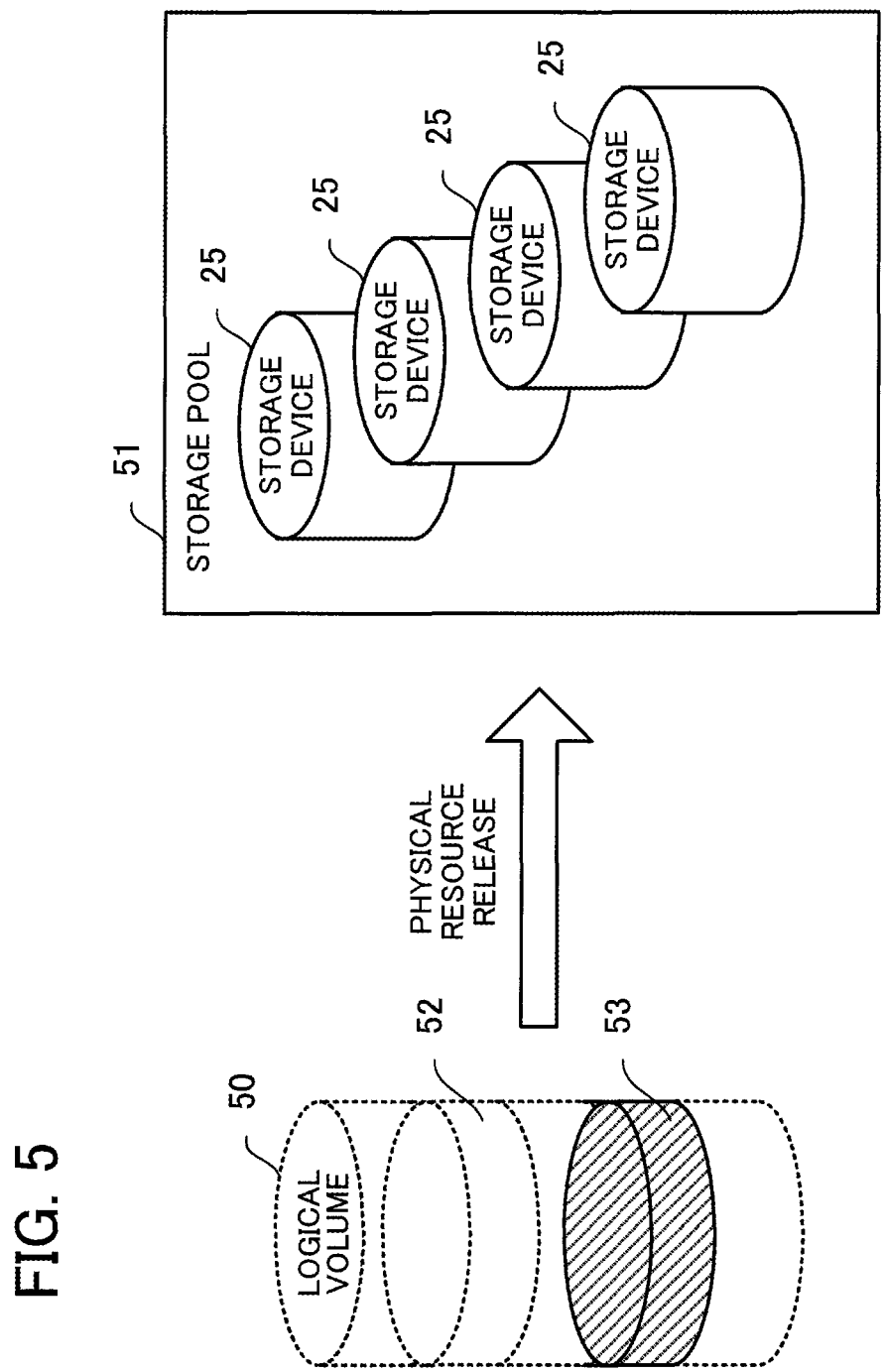
FIG. 5 illustrates release of physical resources from a logical volume according to the second embodiment.

FIG. 5 illustrates release of physical resources from the logical volume 50 according to the second embodiment. The storage apparatus 20 issues an "UNMAP" (area release) command for an area that is no longer used after physical resource allocation so as to release its physical resources. The "UNMAP" command is a command for releasing physical resources of an area that is no longer needed in the file system. For example, referring to the logical volume 50 of FIG. 5, an "UNMAP" command is issued for the area 52 that is no longer used so as to release its physical resources and return the physical resources to the storage pool 51.

Figure 6:
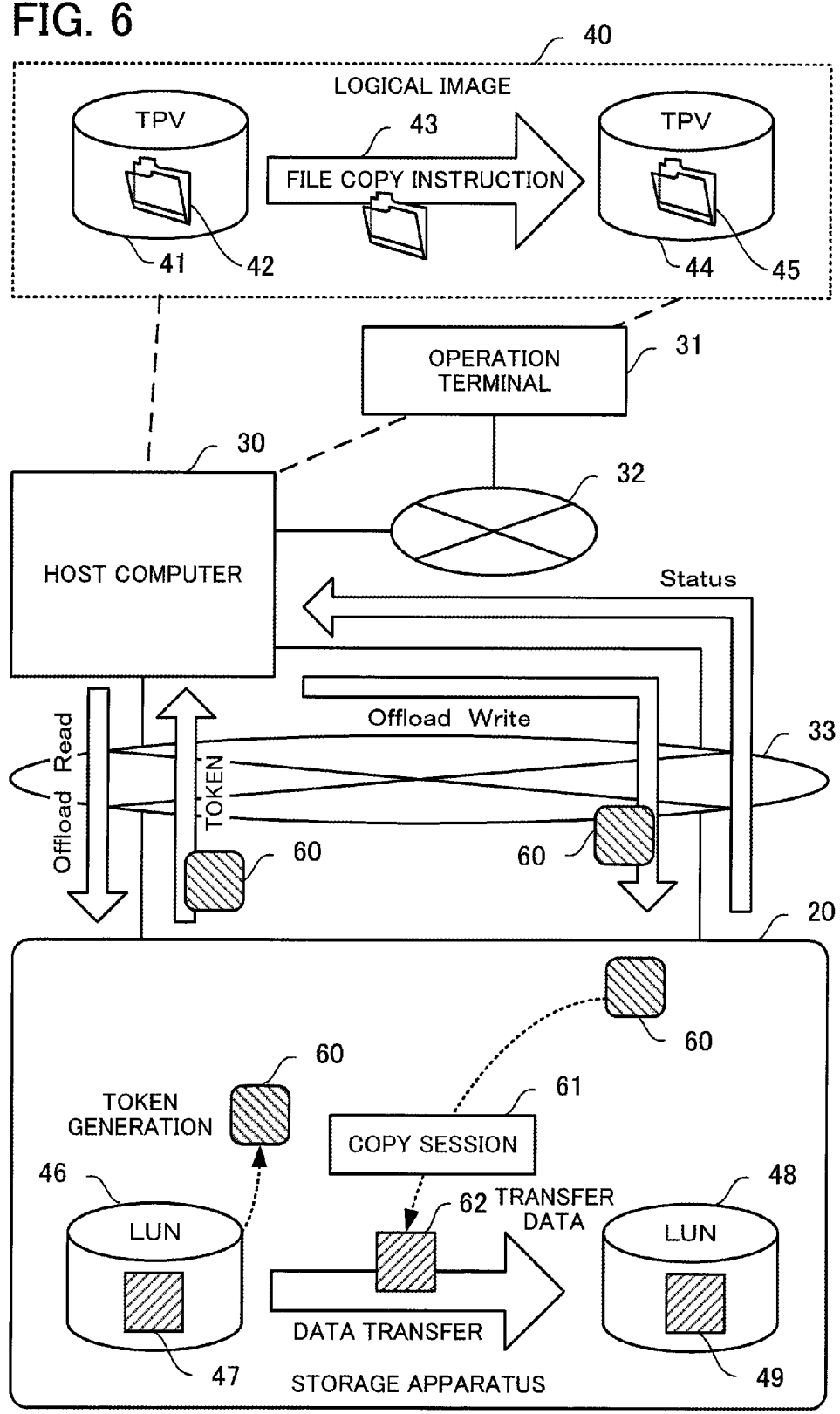
FIG. 6 illustrates an exemplary copy operation upon offload data transfer according to the second embodiment.

Next, a copy operation upon offload data transfer performed by the CPU 22 according to the second embodiment will be described with reference to FIG. 6. FIG. 6 illustrates an exemplary copy operation upon offload data transfer according to the second embodiment.

When the operation terminal 31 performs an operation for instructing copying a file, the host computer 30 performs offload data transfer. For instance, the host computer 30 provides a logical image 40 to the operation terminal 31. The logical image 40 contains thin provisioning volumes (TPVs) 41 and 44 as illustrated in FIGS. 4 and 5. The operation terminal 31 issues a file copy instruction 43 to copy a file 42 from the TPV 41 to the TPV 44 as a file 45, for example.

Having received the file copy instruction 43, the host computer 30 transmits an "Offload Read" instruction to the storage apparatus 20. The "Offload Read" contains information that specifies transfer source data.

Having received the "Offload Read", the storage apparatus 20 generates a token 60 which contains information that specifies transfer source data. For example, the information that specifies transfer source data contains a transfer source logical unit number (LUN) 46, a transfer source area 47, transfer data size, and the like. The storage apparatus 20 transmits the generated token 60 to the host computer 30.

The host computer 30 transmits an "Offload Write" instruction to the storage apparatus 20. The "Offload Write" contains information indicating a transfer destination area and the token 60 received from the storage apparatus 20.

The storage apparatus 20 having received the "Offload Write" obtains transfer target data and information indicating a transfer destination area. Thus, the storage apparatus 20 identifies the transfer source LUN 46, the transfer source area 47, the transfer data size, a transfer destination LUN 48, and a transfer destination area 49. The storage apparatus 20 creates a copy session 61 on the basis of the identified information.

In accordance with the copy session 61, the storage apparatus 20 transfers transfer data 62 from the transfer source area 47 of the transfer source LUN 46 to the transfer destination area 49 of the transfer destination LUN 48.

When the transfer of the transfer data 62 is completed, the storage apparatus 20 transmits a "Status" to the host computer 30. The "Status" is a response indicating completion of offload data transfer.

In this way, when performing an offload read, the host computer 30 obtains the token 60 as information that specifies transfer target data of the storage apparatus 20. Further, when performing an offload write, the host computer 30 transmits the token 60 as information that specifies transfer target data of the storage apparatus 20.

Thus, with use of the token 60, the host computer 30 does not need to read or write the transfer data 62. Further, the CPU load of the host computer 30 and the load on the network 33 connecting the host computer 30 and the storage apparatus 20 are reduced.

Figure 7:
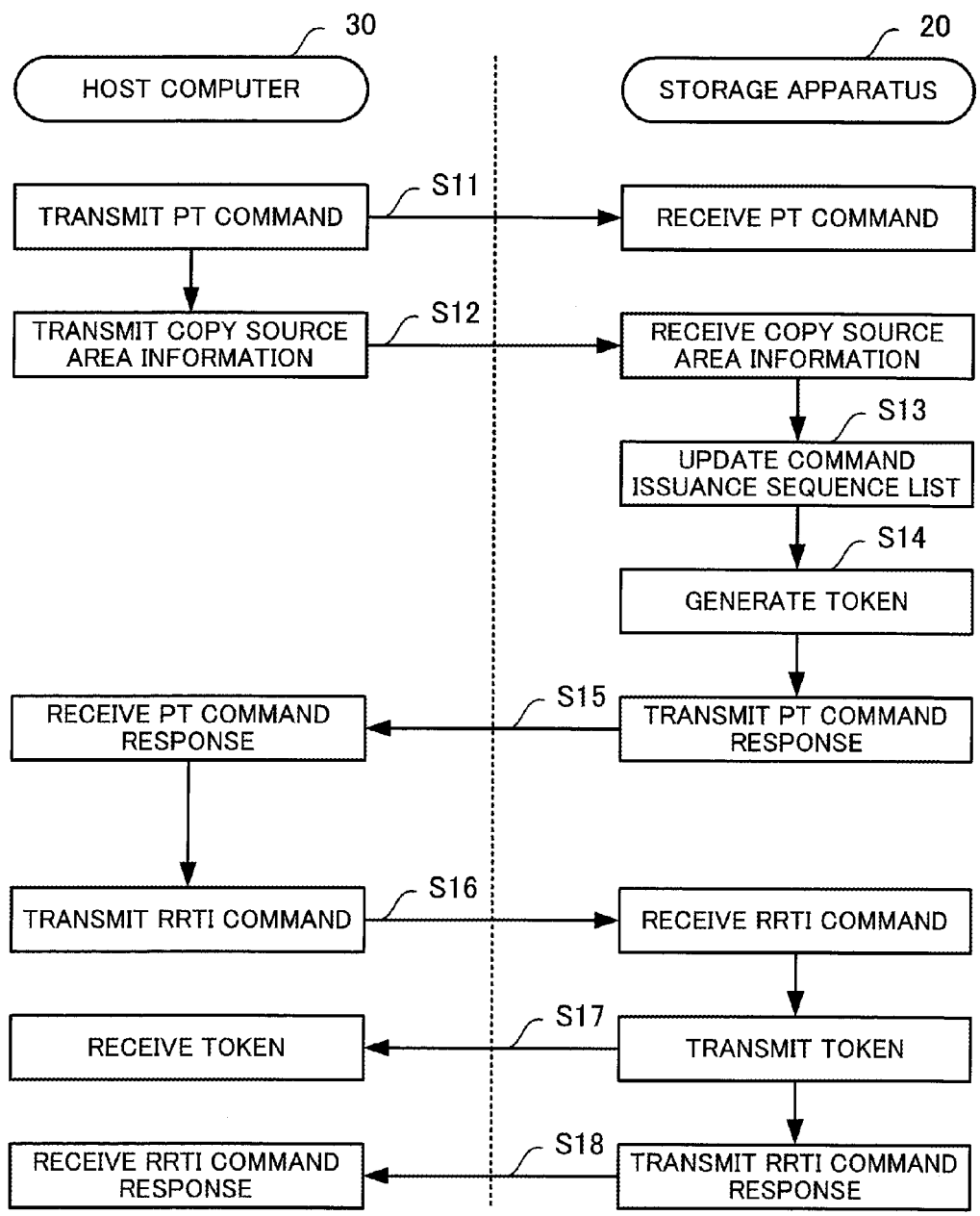
FIG. 7 is a sequence diagram illustrating an offload read process upon offload data transfer according to the second embodiment.

Next, a detailed command sequence upon transmission of an "Offload Read" from the host computer 30 to the storage apparatus 20 and transmission of a token 60 from the storage apparatus 20 to the host computer 30 illustrated in FIG. 6 will be described with reference to FIG. 7. FIG. 7 is a sequence diagram illustrating an offload read process upon offload data transfer according to the second embodiment.

When an operation for instructing to copy a file is received from the operation terminal 31, the host computer 30 starts an offload read process. The instruction of "Offload Read" may be realized by using an "EXTENDED COPY" command and a "RECEIVE COPY RESULTS" command defined by Small Computer System Interface (SCSI) standards. In this case, the "EXTENDED COPY" command is referred to as a "Populate Token (PT)" command, and the "RECEIVE COPY RESULTS" command is referred to as a "Receive Rod Token Information (RRTI)" command.

(Step S11) The host computer 30 transmits a "PT" command to the copy (transfer) source storage apparatus 20. The storage apparatus 20 receives the "PT" command from the host computer 30.

(Step S12) The host computer 30 transmits copy source area information to the storage apparatus 20. The storage apparatus 20 receives the copy source area information from the host computer 30. The copy source area information (information that specifies transfer source data) is in a list format in which a record containing the transfer source LUN 46 and the transfer source area 47 is stored as one element.

(Step S13) The storage apparatus 20 updates a command issuance sequence list in response to reception of the "PT" command.

Figure 8:
FIG. 8 illustrates an example of a command issuance sequence list according to the second embodiment.

The following describes a command issuance sequence list with reference to FIG. 8. FIG. 8 illustrates an example of a command issuance sequence list according to the second embodiment.

A command issuance sequence list 70 contains identification information and the command name. The identification information is information that uniquely identifies a received command. For example, the identification information may be a sequential number. Sequential numbers are assigned in the order in which commands are received. The command name is information indicating the command type. Received commands are added to the command issuance sequence list 70 in the order in which the commands are received. Thus, with the command issuance sequence list 70, it is possible to determine the sequential relationship between the commands received by the storage apparatus 20. Note that commands to be added to the command issuance sequence list 70 include "PT" commands and "UNMAP" commands.

For example, records in the command issuance sequence list 70 indicate that a "PT" command of identification information "1", an "UNMAP" command of identification information "2", and a "PT" command of identification information "3" are received in this order.

Note that the "PT" command held in the command issuance sequence list 70 indicates that data transfer instructed by the "PT" command is pending (in a pending state). Further, the storage apparatus 20 has a command issuance sequence list 70 for each transfer source volume.

Referring back to FIG. 7, the offload read process upon offload data transfer will be further described.

(Step S14) The storage apparatus 20 generates a token (Representation of Data (ROD) token) 60. The storage apparatus 20 holds the generated token 60 such that the token 60 may be searched for afterwards.

(Step S15) The storage apparatus 20 transmits a "PT" command response to the host computer 30. The host computer 30 receives the "PT" command response from the storage apparatus 20.

(Step S16) The host computer 30 transmits an "RRTI" command to the storage apparatus 20. The storage apparatus 20 receives the "RRTI" command from the host computer 30.

(Step S17) The storage apparatus 20 transmits the token 60 to the host computer 30. The host computer 30 receives the token 60 from the storage apparatus 20.

(Step S18) The storage apparatus 20 transmits an "RRTI" command response to the host computer 30. The host computer 30 receives the "RRTI" command response from the storage apparatus 20.

The "PT" command, the copy source area information, and the "PT" command response correspond to communication of the "Offload Read" of FIG. 6. Further, the "RRTI" command, the token 60, and the "RRTI" command response correspond to communication of the token 60 of FIG. 6.

In the above description, for ease of explanation, it is assumed that the storage apparatus 20 performs communication of the "Offload Read" and communication of the token 60. However, the communication is actually performed by the corresponding controller module 21 of the storage apparatus 20.

Figure 9:
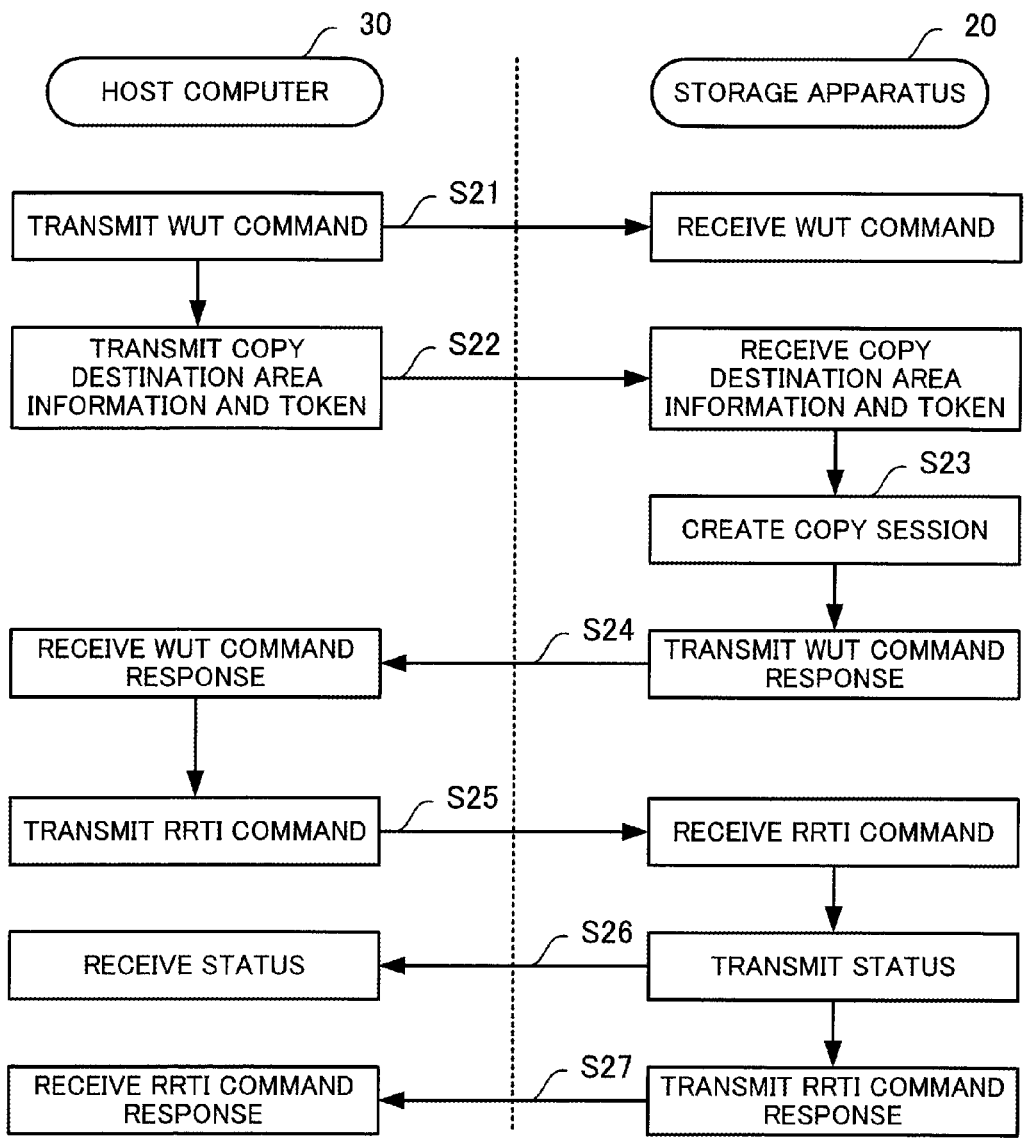
FIG. 9 is a sequence diagram illustrating an offload write process upon offload data transfer according to the second embodiment.

Next, a detailed command sequence upon transmission of an "Offload Write" from the host computer 30 to the storage apparatus 20 and transmission of a "Status" from the storage apparatus 20 to the host computer 30 illustrated in FIG. 6 will be described with reference to FIG. 9. FIG. 9 is a sequence diagram illustrating an offload write process upon offload data transfer according to the second embodiment.

The host computer 30 starts an offload write process. The instruction of "Offload Write" may be realized by using an "EXTENDED COPY" command and a "RECEIVE COPY RESULTS" command defined by SCSI standards. In this case, the "EXTENDED COPY" command is referred to as a "Write Using Token (WUT)" command, and the "RECEIVE COPY RESULTS" command is referred to as an "RRTI" command.

(Step S21) The host computer 30 transmits a "WUT" command to the copy (transfer) destination storage apparatus 20. The storage apparatus 20 receives the "WUT" command from the host computer 30.

(Step S22) The host computer 30 transmits copy destination area information and a token (ROD token) 60 to the storage apparatus 20. The storage apparatus 20 receives the copy destination area information and the token 60 from the host computer 30. The copy destination area information (information that specifies transfer destination data) is in a list format in which a record containing the transfer destination LUN 48 and the transfer destination area 49 is stored as one element.

(Step S23) The storage apparatus 20 searches for and detects a token 60 that matches the received token 60, from tokens 60 held in the storage apparatus 20. The storage apparatus 20 compares the received token 60 with the detected token 60. If the received token 60 matches the detected token 60, the storage apparatus 20 creates a copy session 61 on the basis of the copy destination area information and the token 60.

(Step S24) The storage apparatus 20 transmits a "WUT" command response to the host computer 30. The host computer 30 receives the "WUT" command response from the storage apparatus 20.

(Step S25) The host computer 30 transmits an "RRTI" command to the storage apparatus 20. The storage apparatus 20 receives the "RRTI" command from the host computer 30.

(Step S26) The storage apparatus 20 transmits a "Status" to the host computer 30. The host computer 30 receives the "Status" from the storage apparatus 20.

In the case of an asynchronous operation is performed for offload data transfer, the storage apparatus 20 immediately transmits the "Status" to the host computer 30. On the other hand, in the case of a synchronous operation, the storage apparatus 20 transmits the "Status" after completion of the copy operation.

(Step S27) The storage apparatus 20 transmits an "RRTI" command response to the host computer 30. The host computer 30 receives the "RRTI" command response from the storage apparatus 20.

The "WUT" command, the copy destination area information, the token 60, and the "WUT" command response correspond to communication of the "Offload Write" of FIG. 6. Further, the "RRTI" command, the "Status", and the "RRTI" command response correspond to communication of the "Status" of FIG. 6.

In the above description, for ease of explanation, it is assumed that the storage apparatus 20 performs communication of the "Offload Write" and communication of the "Status". However, the communication is actually performed by the corresponding controller module 21 of the storage apparatus 20.

Figure 10:
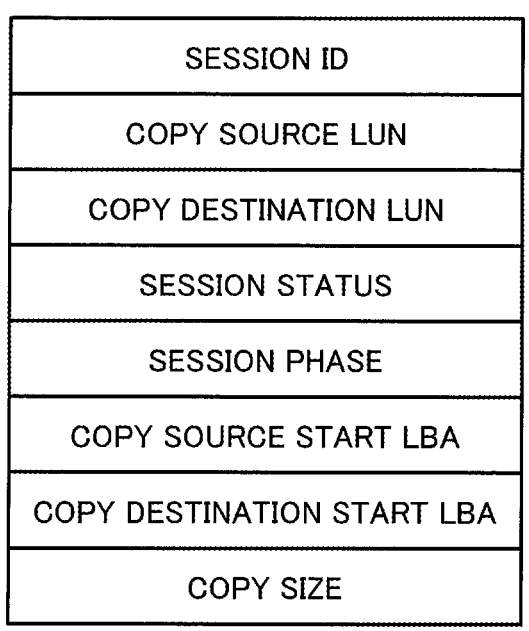
FIG. 10 illustrates an example of a session management table according to the second embodiment.

The following describes a session management table with reference to FIG. 10. FIG. 10 illustrates an example of a session management table according to the second embodiment.

A session management table 71 stores session identification (ID), copy source LUN, copy destination LUN, session status, and session phase. The session management table 71 further contains copy source start Logical Block Address (LBA)(transfer source area), copy destination start LBA (transfer destination area), and copy size (transfer size).

The session ID is identification information that uniquely identifies a copy session. Session IDs are assigned in the order in which copy sessions are created, and may be sequential numbers, for example. The LUN is identification information that uniquely identifies a volume logically divided from a RAID group, and may be a sequential number, for example. The copy source LUN is information indicating a copy source volume. The copy destination LUN is information indicating a copy destination volume.

Note that one RAID group includes one or more volumes (logical units) that are identified by LUNs. Accordingly, in the case where a RAID includes a plurality of storage devices 25, a volume may be created across two or more of the storage devices 25.

The session status is information indicating the status of the copy session, in other words, the progress of a copy operation. The session status may be "Active", "Suspended", "Error Suspended", "Reserve", or the like. The "Active" indicates a state in which a copy operation is in progress. The "Suspended" indicates a state in which a copy operation is suspended. The "Error Suspended" indicates a state in which a copy operation has been failed, and may be a state in which the copy operation is stopped, for example. The "Reserve" indicates a transitional state before a copy operation is started.

The session phase is information indicating the progress of a copy operation. The session phase may be "Copying" or "Equivalent". The "Copying" indicates a state in which a copy operation is in progress. The "Equivalent" indicates a state in which a copy operation is completed, and thus data in the copy source and data in the copy destination have become equivalent.

The copy source start LBA is information indicating a logical block address (LBA) of the copy source volume. The copy destination start LBA is information indicating a logical block address (LBA) of the copy destination volume. The copy size is information indicating the size of copy target data.

Figure 11:
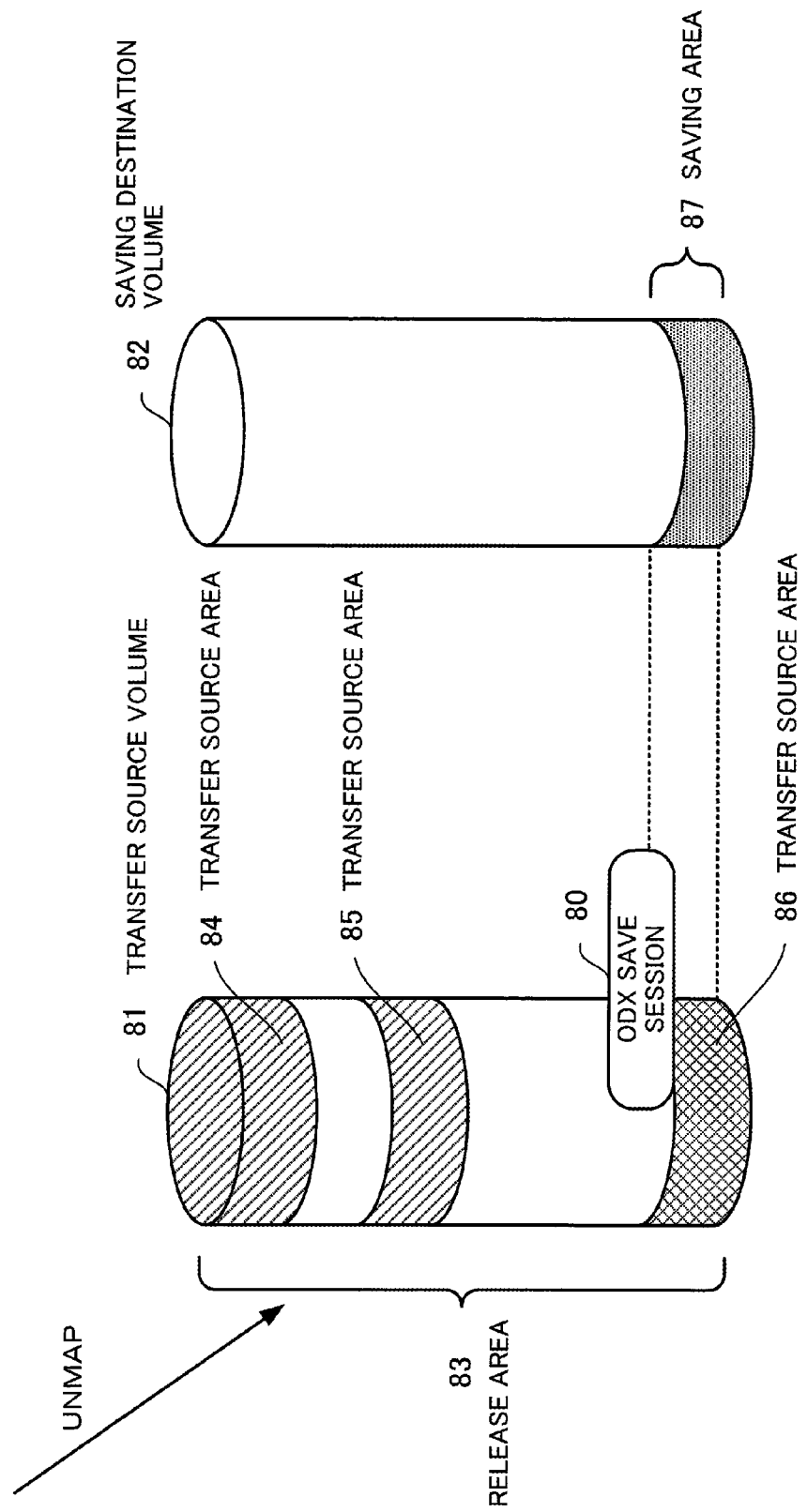
FIG. 11 illustrates an example of an area release operation for a transfer source area according to the second embodiment.
Figure 12:
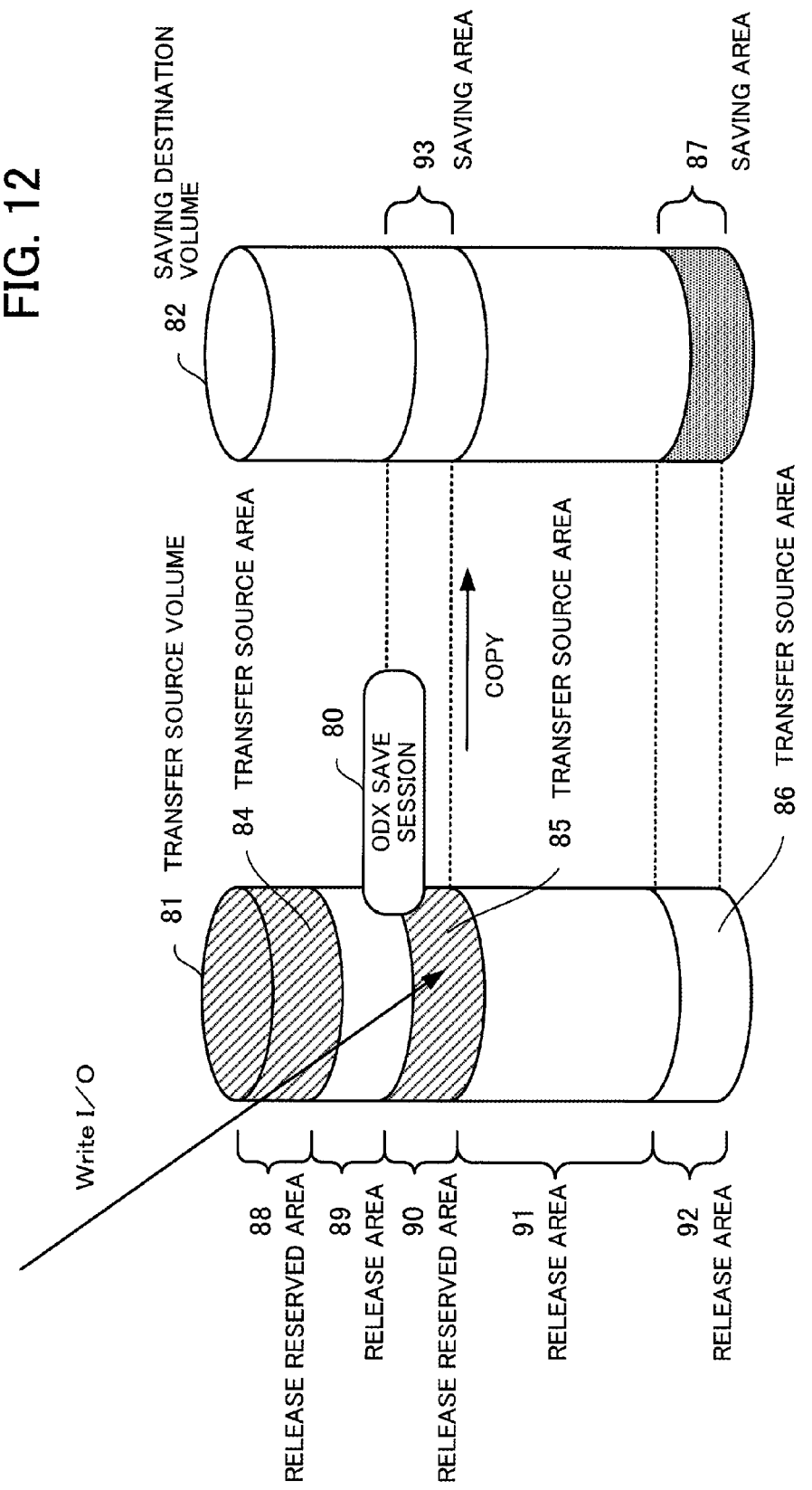
FIG. 12 illustrates an example of an area-release reserved state of a transfer source area according to the second embodiment.

Next, saving of data in the case where the storage apparatus 20 receives a "PT" command, generates a token, and then releases a transfer source area identified by the token will be described with reference to FIGS. 11 and 12. FIG. 11 illustrates an example of an area release operation for a transfer source area according to the second embodiment. FIG. 12 illustrates an example of an area-release reserved state of a transfer source area according to the second embodiment.

First, saving of data will be described with reference to FIG. 11. As described above with reference to FIG. 7, the storage apparatus 20 receives a "PT" command, and generates a token 60. The generated token 60 contains information indicating a transfer source area. For example, the token 60 has a list including transfer source areas 84, 85, and 86 in a transfer source volume 81.

At this point, if the storage apparatus 20 receives an "UNMAP" command from the host computer 30, the storage apparatus 20 issues a completion response for the "UNMAP" command, asynchronously with release of a release area 83 specified by the "UNMAP" command. Note that when the release area 83 is not yet released although a completion response for the "UNMAP" command has been issued, the release area 83 is in an area-release reserved state (UNMAP reserved state).

Note that the storage apparatus 20 releases the transfer source areas 84, 85, and 86. As for the transfer source area 86 with updated data, since the storage apparatus 20 has saved data before update to a saving area 87 in a saving destination volume 82 in accordance with a "Write I/O", the storage apparatus 20 executes area release.

Note that the storage apparatus 20 creates an offload data transfer (ODX) SAVE session 80 so as to save data before update to the saving area 87. The ODX SAVE session 80 will be described later with reference to FIGS. 13 and 14.

Next, an area-release reserved state will be described with reference to FIG. 12. FIG. 12 illustrates an example of an area-release reserved state of a transfer source area according to the second embodiment.

In the storage apparatus 20, the transfer source volume 81 includes release areas 89, 91, and 92, and release reserved areas 88 and 90. When the storage apparatus 20 receives a "Write I/O" for the transfer source area 85, the storage apparatus 20 creates an ODX SAVE session 80 so as to save data from the transfer source area 85 to a saving area 93.

Further, in the case where the validity period of the token 60 ends, the storage apparatus 20 cancels an area-release reserved state of a transfer source area which has been in the area-release reserved state in accordance with an instruction of area release, and releases the transfer source area.

In this way, when a predetermined condition is satisfied, the storage apparatus 20 cancels an area-release reserved state of a transfer source area which has been in the area-release reserved state in accordance with an instruction of area release, and releases the transfer source area. Thus, the storage apparatus 20 makes it possible to reduce the time and memory resources needed to save data stored in the transfer source area.

Figure 13:
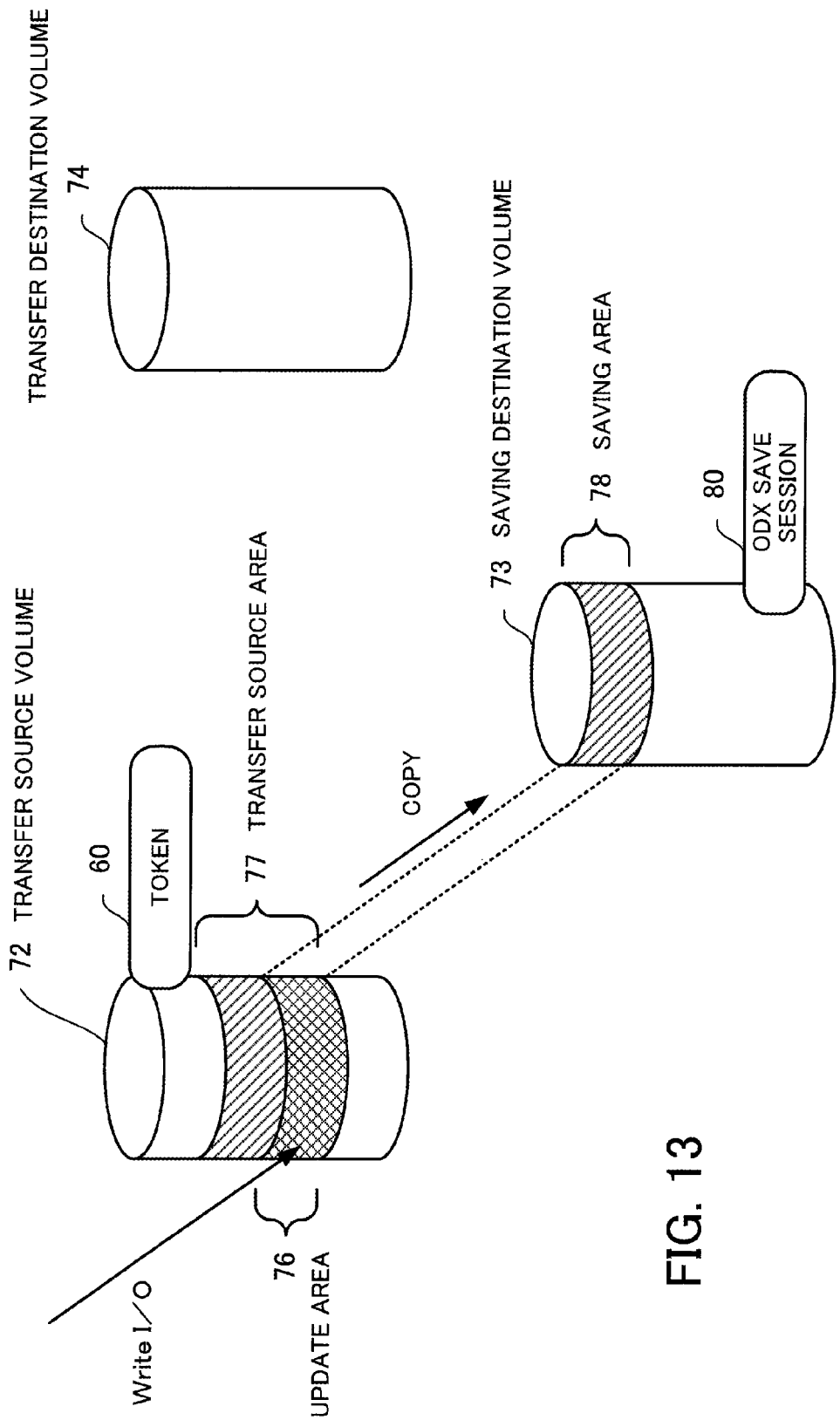
FIG. 13 illustrates an example of saving data stored in a transfer source area according to the second embodiment.
Figure 14:
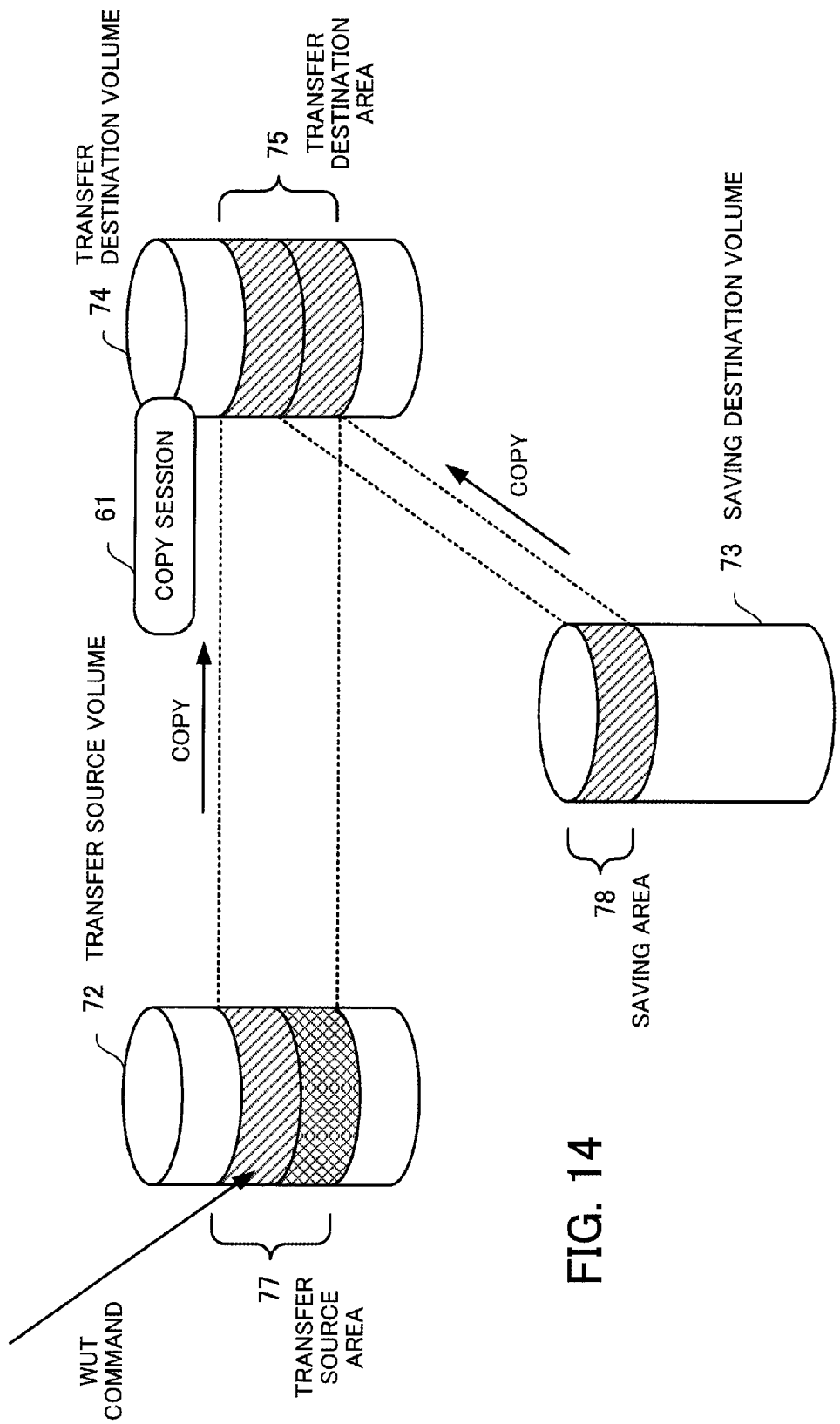
FIG. 14 illustrates an exemplary copy operation in the case where data are saved according to the second embodiment.

Next, creation of an ODX SAVE session will be described with reference to FIGS. 13 and 14. FIG. 13 illustrates an example of saving data stored in a transfer source area according to the second embodiment.

First, saving of data will be described with reference to FIG. 13. As described above with reference to FIG. 7, the storage apparatus 20 receives a "PT" command, and generates a token 60. The generated token 60 contains information indicating a transfer source area. The token 60 has a validity period set by the storage apparatus 20, and is valid for the validity period.

At this point, if the storage apparatus 20 receives a "Write I/O" for updating data in an update area 76 from the host computer 30, data in a transfer source area 77 of a transfer source volume 72 are updated and become different from the data at the time of generation of the token 60. Suppose that the storage apparatus 20 then receives a "WUT" command. In this case, the storage apparatus 20 copies data different from the data at the time of generation of the token 60 to a transfer destination volume 74.

In order to prevent data at the time of reception of the "WUT" command from being different from the data at the time of generation of the token 60, in the case where the storage apparatus 20 updates part or all of the data in the transfer source area after reception of the "PT" command, the storage apparatus 20 saves data stored in the update area 76. The storage apparatus 20 saves the data from the update area 76 to a saving area 78 of a prepared saving destination volume (volume exclusively for saving) 73. Note that the update area 76 forms a part of the transfer source area 77 in FIG. 13, the update area 76 may partially overlap the transfer source area 77. In that case, the storage apparatus 20 saves an overlapping area where the update area 76 and the transfer source area 77 overlap each other to the saving area 78.

At this point, the storage apparatus 20 creates an ODX SAVE session 80 as a copy session for copying data before update from the update area 76 to the saving area 78. In the case where the storage apparatus 20 receives a "Write I/O" for an area overlapping the transfer source area 77 after receiving a "PT" command, the storage apparatus creates the ODX SAVE session 80 in response to the "Write I/O". Further, only in the case where the storage apparatus 20 receives a "Write I/O" for an area overlapping the transfer source area 77, the storage apparatus 20 performs a copy operation of the ODX SAVE session 80.

After performing the copy operation of the ODX SAVE session 80, the storage apparatus 20 updates data in accordance with the "Write I/O". After updating data in accordance with the "Write I/O", the storage apparatus 20 issues a completion response for the "Write I/O".

Note that the storage apparatus 20 deletes the ODX SAVE session 80 when the validity period of the token 60 ends.

Next, copying data from the saving destination volume 73 will be described with reference to FIG. 14. FIG. 14 illustrates an exemplary copy operation in the case where data are saved according to the second embodiment.

When the storage apparatus 20 receives a "WUT" command from the host computer 30, the storage apparatus 20 creates a copy session 61 and returns a "WUT" command response to the host computer 30. At this point, since the copy session 61 is created on the basis of a token 60, the host computer 30 is not guaranteed the data at the time of generation of the token 60.

The storage apparatus 20 copies data from the transfer source area 77 to a transfer destination area 75 by transferring the data, in accordance with the copy session 61. The storage apparatus 20 copies data from the saving area 78 to the transfer destination area 75 of the transfer destination volume 74 by overwriting data therein. Thus, the storage apparatus 20 reliably copies the data at the time of reception of the "PT" command.

Figure 15:
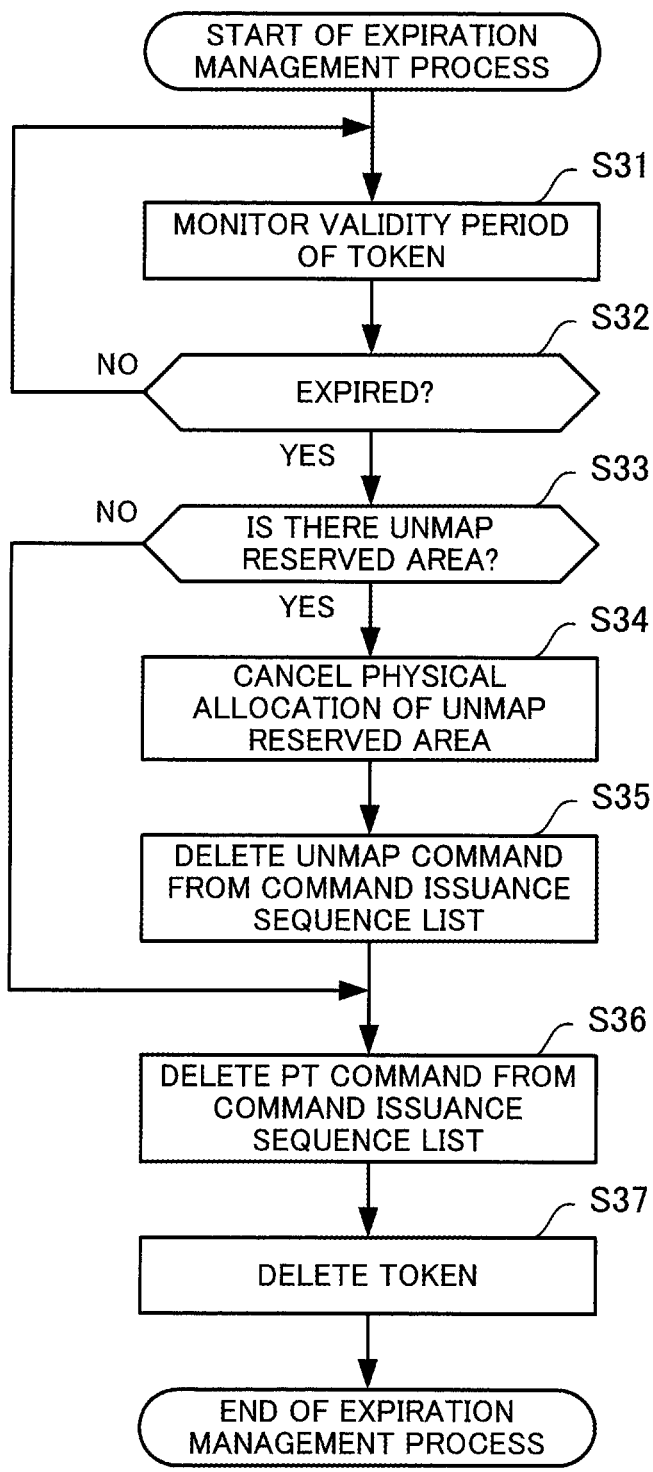
FIG. 15 is a flowchart of an expiration management process according to the second embodiment.

Next, an expiration management process performed by the storage apparatus 20 according to the second embodiment will be described with reference to FIG. 15. FIG. 15 is a flowchart of an expiration management process according to the second embodiment. The expiration management process is performed after generation of the token 60. The expiration management process is a process for canceling an area-release reserved state of a transfer source area which has been in the area-release reserved state in accordance with an instruction of area release, and releasing the transfer source area, in the case where the validity period of the token 60 ends.

(Step S31) The storage apparatus 20 monitors the validity period of the token 60.

(Step S32) If the token 60 is within the validity period, the process proceeds to step S31. If the token 60 is invalid, the process proceeds to step S33.

(Step S33) The storage apparatus 20 determines whether there is an UNMAP reserved area, that is, whether there is a transfer source area in the area-release reserved state. The storage apparatus 20 determines whether there is an UNMAP reserved area by comparing information regarding a transfer source area contained in the token 60 with an UNMAP reserved area. If there is an UNMAP reserved area, the process proceeds to step S34. On the other hand, if there is no UNMAP reserved area, the process proceeds to step S36.

(Step S34) The storage apparatus 20 cancels the physical allocation of the UNMAP reserved area. That is, the storage apparatus 20 releases the transfer source area in the area-release reserved state. Accordingly, the storage apparatus 20 does not need to save data from the transfer source area in the area-release reserved state to the saving destination volume 82, and thus makes it possible to reduce the time and memory resources needed to save data stored in the transfer source area.

(Step S35) The storage apparatus 20 deletes the "UNMAP" command from the command issuance sequence list 70.

(Step S36) The storage apparatus 20 deletes the "PT" command from the command issuance sequence list 70.

(Step S37) The storage apparatus 20 deletes the token 60. Thus, the expiration management process ends.

In the above description, for ease of explanation, it is assumed that the storage apparatus 20 performs the expiration management process. However, the expiration management process is actually performed by the corresponding controller module 21 of the storage apparatus 20.

Figure 16:
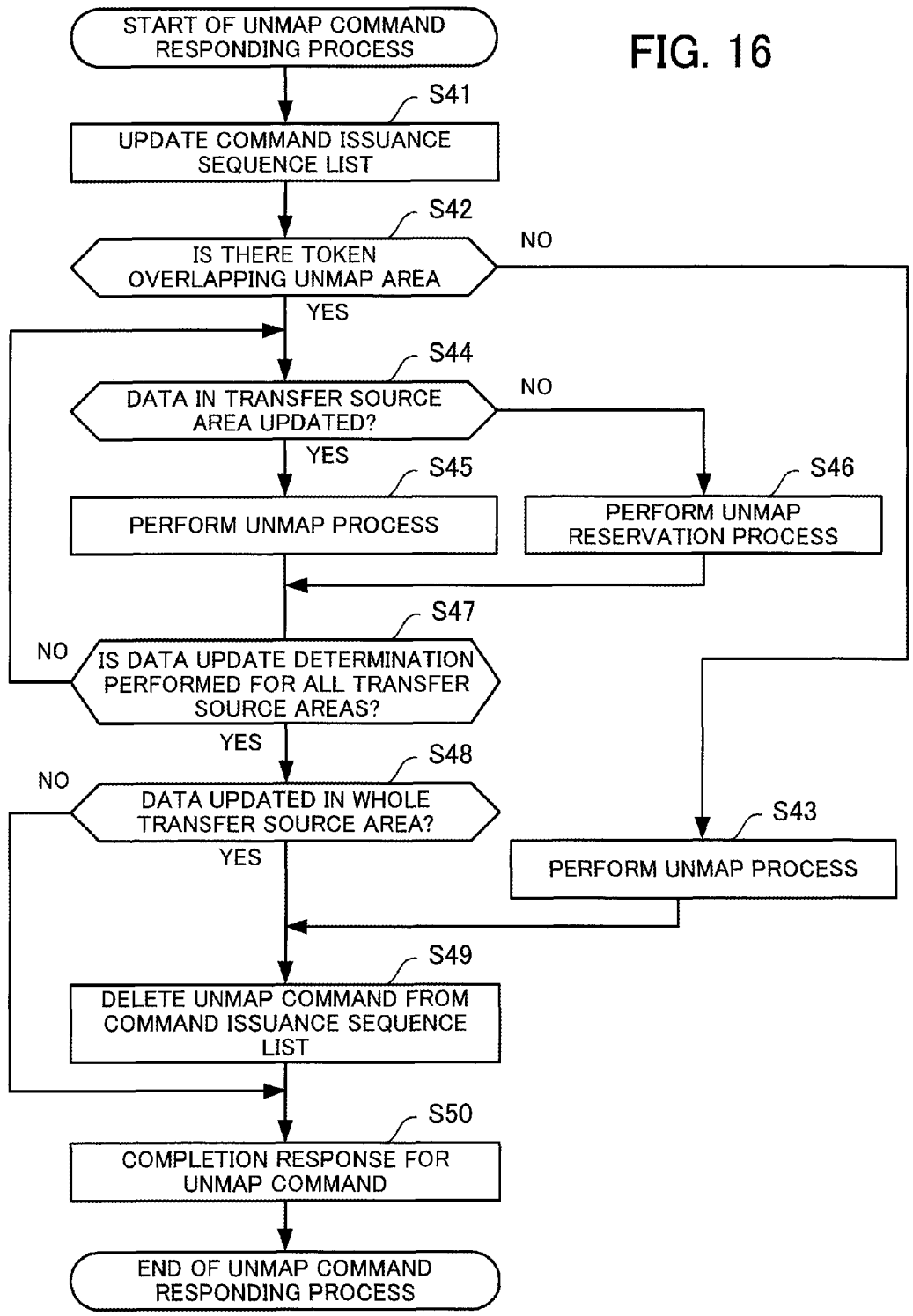
FIG. 16 is a flowchart of an UNMAP command responding process according to the second embodiment.

Next, an UNMAP command responding process performed by the storage apparatus 20 according to the second embodiment will be described with reference to FIG. 16. FIG. 16 is a flowchart of an UNMAP command responding process according to the second embodiment. The UNMAP command responding process is performed in response to reception of an "UNMAP" command. The UNMAP command responding process is performed by the storage apparatus 20 which has received the "UNMAP" command, and is performed so as to release an area specified to be released or so as to set the area in the area-release reserved state.

(Step S41) The storage apparatus 20 receives an "UNMAP" command, and updates the command issuance sequence list 70. More specifically, the storage apparatus 20 adds the received "UNMAP" command to the command issuance sequence list 70.

(Step S42) The storage apparatus 20 determines whether there is a token 60 indicating a transfer source area which overlaps an area (UNMAP area) specified to be released by the "UNMAP" command. Note that even if there is a token 60 indicating a transfer source area which overlaps the UNMAP area, in the case where the validity period of the token 60 is over, the storage apparatus 20 determines that there is no token 60 indicating a transfer source area which overlaps the UNMAP area.

If there is a token 60 that indicates a transfer source area which overlaps the UNMAP area, the process proceeds to step S44. On the other hand, if there is no token 60 that indicates a transfer source area which overlaps the UNMAP area, the process proceeds to step S43.

(Step S43) The storage apparatus 20 releases (performs UNMAP process for) the UNMAP area.

(Step S44) The storage apparatus 20 determines whether data are updated in an area selected from UNMAP areas which overlap transfer source areas indicated by the token 60. If the data in the selected area are updated, the process proceeds to step S45. On the other hand, if the data are not updated, the process proceeds to step S46.

(Step S45) The storage apparatus 20 performs an UNMAP process for the selected area, that is, an update area (a transfer source area where data are updated).

(Step S46) The storage apparatus 20 performs an UNMAP reservation process for reserving release of the selected area, that is, a not-updated area, and sets the area to the area-release reserved state.

(Step S47) The storage apparatus 20 determines whether the data update determination (the determination of step S44) is performed for all the UNMAP areas which overlap the transfer source areas indicated by the token 60. If the determination is performed for all the UNMAP areas which overlap the transfer source areas indicated by the token 60, the process proceeds to step S48. If not, the process proceeds to step S44.

(Step S48) The storage apparatus 20 determines whether data in the whole transfer source area are updated. If the data are updated in the whole transfer source area, the process proceeds to step S49. On the other hand, if data are not updated in at least a part of the transfer source area, the process proceeds to step S50.

(Step S49) The storage apparatus 20 deletes the corresponding "UNMAP" command from the command issuance sequence list 70.

(Step S50) The storage apparatus 20 returns an "UNMAP" command response to the host computer 30. Thus, the UNMAP command responding process ends.

In the above description, for ease of explanation, it is assumed that the storage apparatus 20 performs the UNMAP command responding process. However, the UNMAP command responding process is actually performed by the corresponding controller module 21 of the storage apparatus 20.

Figure 17:
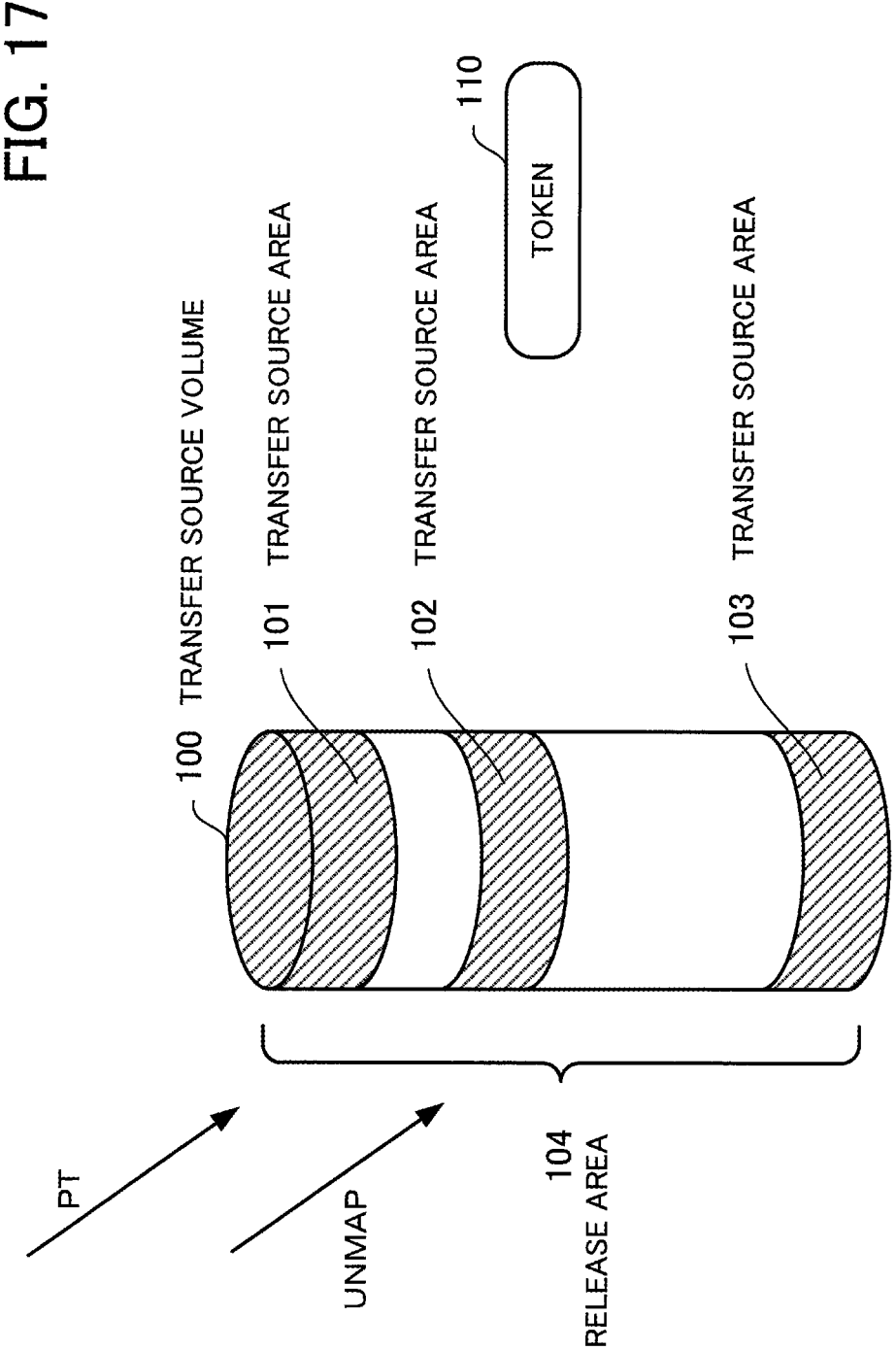
FIG. 17 illustrates an example of a transfer source volume in the case where an "UNMAP" command is issued after issuance of a "PT" command.
Figure 18:
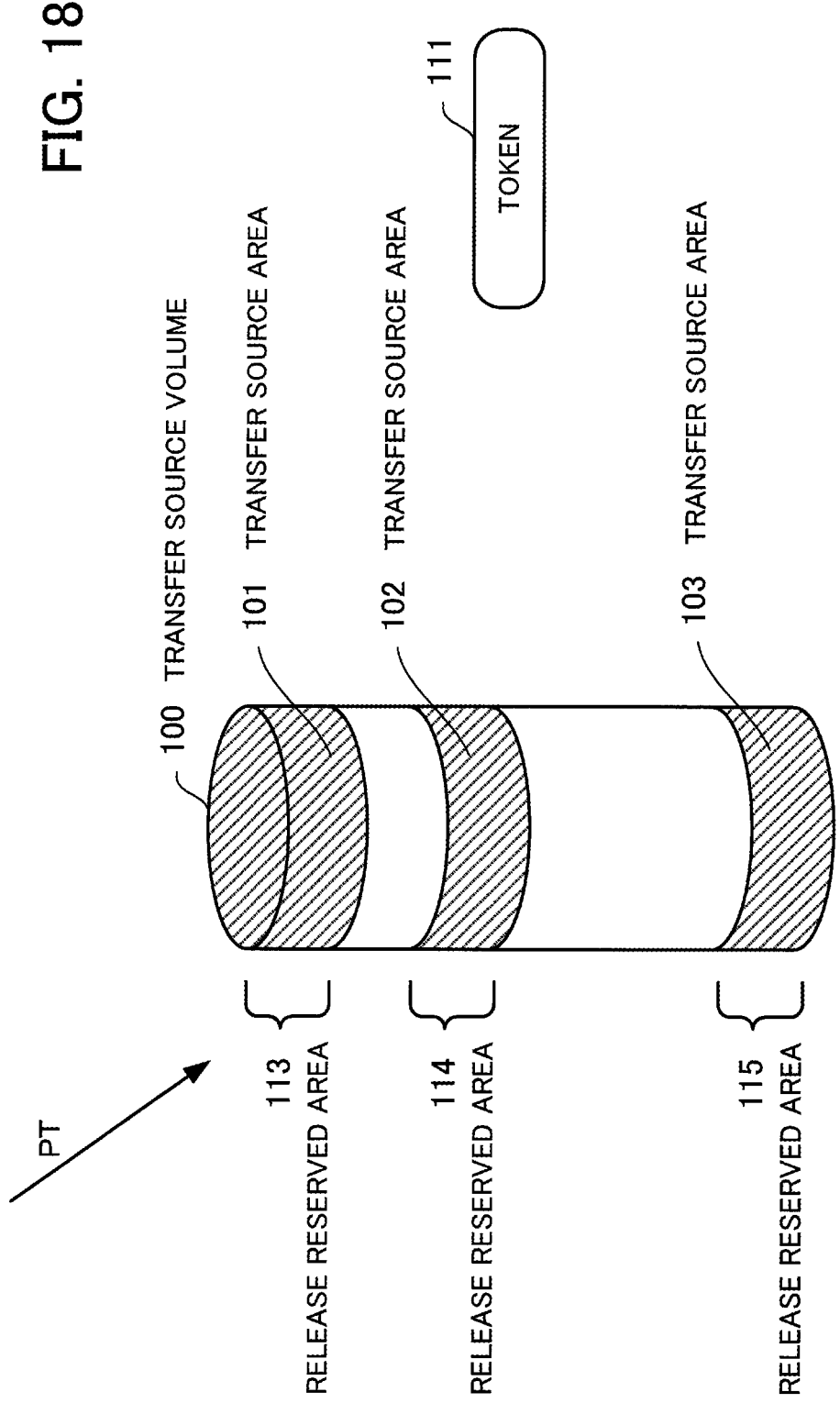
FIG. 18 illustrates an example of a transfer source volume in the case where a "PT" command is issued after issuance of an "UNMAP" command.

Next, copying dada in the case where a "PT" command is issued before and after issuance of an "UNMAP" command will be described with reference to FIGS. 17 through 19.

First, a "PT" command issued before issuance of an "UNMAP" command will be described with reference to FIG. 17. FIG. 17 illustrates an example of a transfer source volume in the case where an "UNMAP" command is issued after issuance of a "PT" command.

When a "PT" command is received, that is, when a "PT" command is issued, the storage apparatus 20 generates a token 110 indicating transfer source areas 101, 102, and 103 of a transfer source volume 100.

When the storage apparatus 20 receives an "UNMAP" command after the "PT" command, the storage apparatus 20 issues a completion response for the "UNMAP" command, asynchronously with release of a release area 104 specified by the "UNMAP" command. Note that the release area 104 overlaps the transfer source areas 101, 102, and 103.

Note that since the order in which the "PT" command and the "UNMAP" command are issued is registered in the command issuance sequence list 70, the storage apparatus 20 may determine the order in which the "PT" command and the "UNMAP" command are issued by referring to the command issuance sequence list 70.

Next, a "PT" command issued after issuance of an "UNMAP" command will be described with reference to FIG. 18. FIG. 18 illustrates an example of a transfer source volume in the case where a "PT" command is issued after issuance of an "UNMAP" command.

Since the "UNMAP" command is received after the "PT" command, the transfer source areas 101, 102, and 103 in the transfer source volume 100 are set to the area-release reserved state. That is, the storage apparatus 20 has release reserved areas 113, 114, and 115 in the transfer source volume 100.

When a "PT" command is received after the "UNMAP" command, the storage apparatus 20 generates a token 111 indicating the transfer source areas 101, 102, and 103 of the transfer source volume 100.

Note that since the "PT" command is registered in the command issuance sequence list 70, the storage apparatus 20 may determine the order in which the "UNMAP" command and the "PT" command are issued by referring to the command issuance sequence list 70.

Next, a copy operation in the case where a "WUT" command based on the tokens 110 and 111 that are generated in accordance with "PT" commands is received will be described with reference to FIG. 19. FIG. 19 illustrates an example of copying data in the case where a "PT" command is issued before and after issuance of an "UNMAP" command.

In the case where a "WUT" command based on the token 110 is received, the storage apparatus 20 determines whether the transfer source areas 101, 102, and 103 indicated by the token 110 overlap the release reserved areas 113, 114, and 115. Since there are overlaps, the storage apparatus 20 determines the order in which the "PT" command that generated the token 110 and the "UNMAP" command that set the release reserved areas 113, 114, and 115 are issued. Since the "PT" command that generated the token 110 is issued before the "UNMAP" command, the storage apparatus 20 transfers and copies, as data before area release, the actual data in the transfer source areas 101, 102, and 103 to the transfer destination volume 117.

On the other hand, in the case where a "WUT" command based on the token 111 is received, the storage apparatus 20 determines whether the transfer source areas 101, 102, and 103 indicated by the token 111 overlap the release reserved areas 113, 114, and 115. Since there are overlaps, the storage apparatus 20 determines the order in which the "PT" command that generated the token 111 and the "UNMAP" command that set the release reserved areas 113, 114, and 115 are issued. Since the "PT" command that generated the token 111 is issued after the "UNMAP" command, the storage apparatus 20 transfers and copies clear data, as data after area release, to the transfer destination volume 117. The clear data may be zero data or any other arbitrary data.

In this way, even in the case where a "PT" command is issued before and after an "UNMAP" command, the storage apparatus 20 may transfer data without losing data. Further, the storage apparatus 20 makes it possible to reduce the frequency of saving data. Thus, the storage apparatus 20 makes it possible to reduce the time and memory resources needed to save data stored in the transfer source area.

Figure 20:
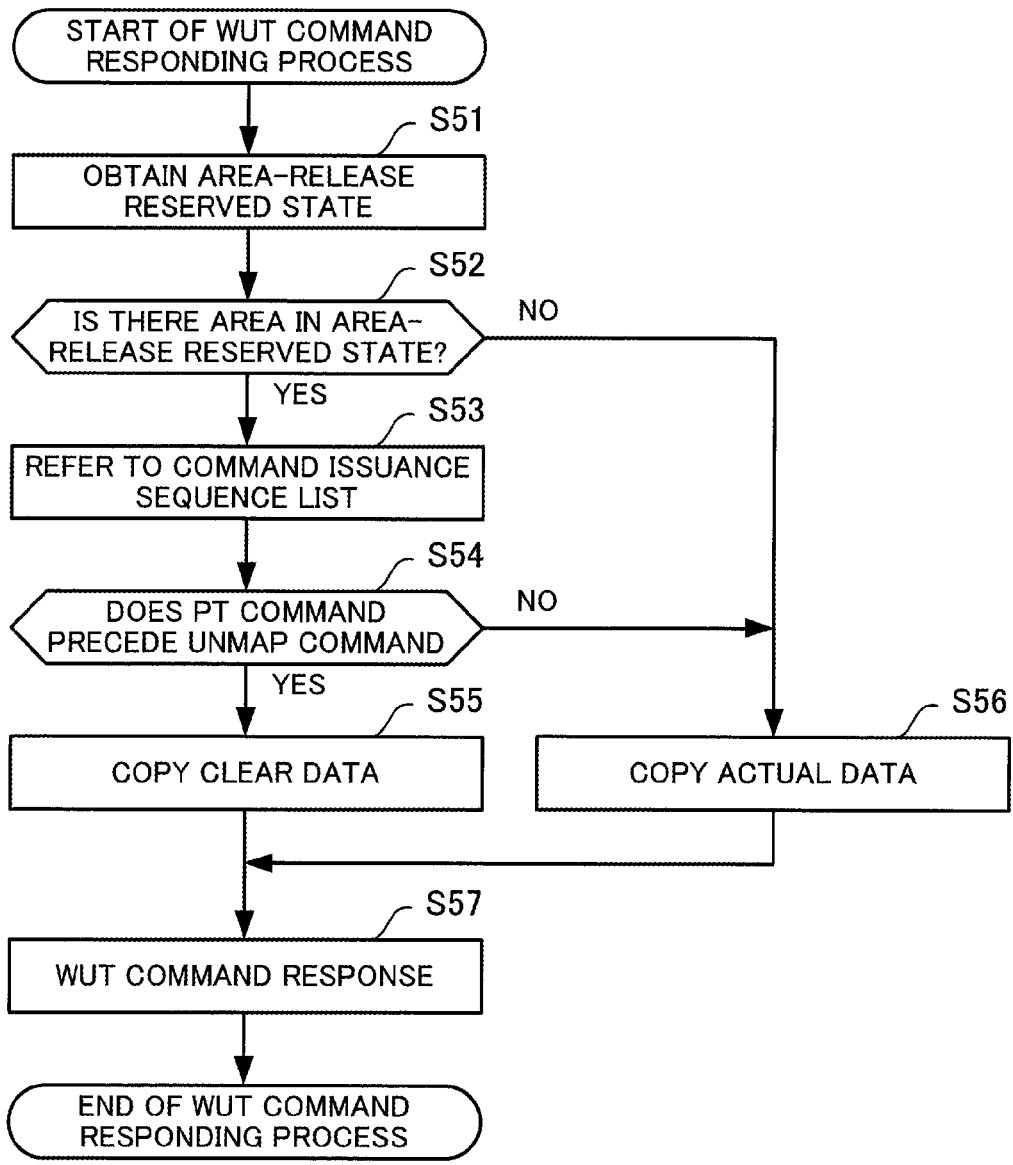
FIG. 20 is a flowchart of a WUT command responding process according to the second embodiment.

Next, a WUT command responding process performed by the storage apparatus 20 according to the second embodiment will be described with reference to FIG. 20. FIG. 20 is a flowchart of a WUT command responding process according to the second embodiment. The WUT command responding process is performed in response to reception of a "WUT" command. The WUT command responding process is a process for performing, in the case where there is a transfer source area in the area-release reserved state, a copy operation in accordance with the sequential relationship between a "PT" command and an "UNMAP" command.

(Step S51) The storage apparatus 20 obtains an area-release reserved state that is set in the transfer source volume.

(Step S52) The storage apparatus 20 determines whether an area-release reserved state is set in the transfer source volume. If an area-release reserved state is not set in the transfer source volume, the process proceeds to step S56. On the other hand, if an area-release reserved state is set, the process proceeds to step S53.

(Step S53) The storage apparatus 20 refers to the command issuance sequence list 70.

(Step S54) When a "WUT" command is received, the storage apparatus 20 determines whether a "PT" command that generated a token 60 received together with the "WUT" command precedes the "UNMAP" command. If the "PT" command precedes the "UNMAP" command, the process proceeds to step S55. On the other hand, if the "UNMAP" command precedes the "PT" command, the process proceeds to step S56.

(Step S55) The storage apparatus 20 copies, as clear data, the transfer data from the transfer source area in the area-release reserved state to the transfer destination area.

(Step S56) The storage apparatus 20 copies, as actual data, the transfer data from the transfer source area in the area-release reserved state to the transfer destination area.

(Step S57) The storage apparatus 20 returns a "WUT" command to the host computer 30. Thus, the WUT command responding process ends.

Figure 19:
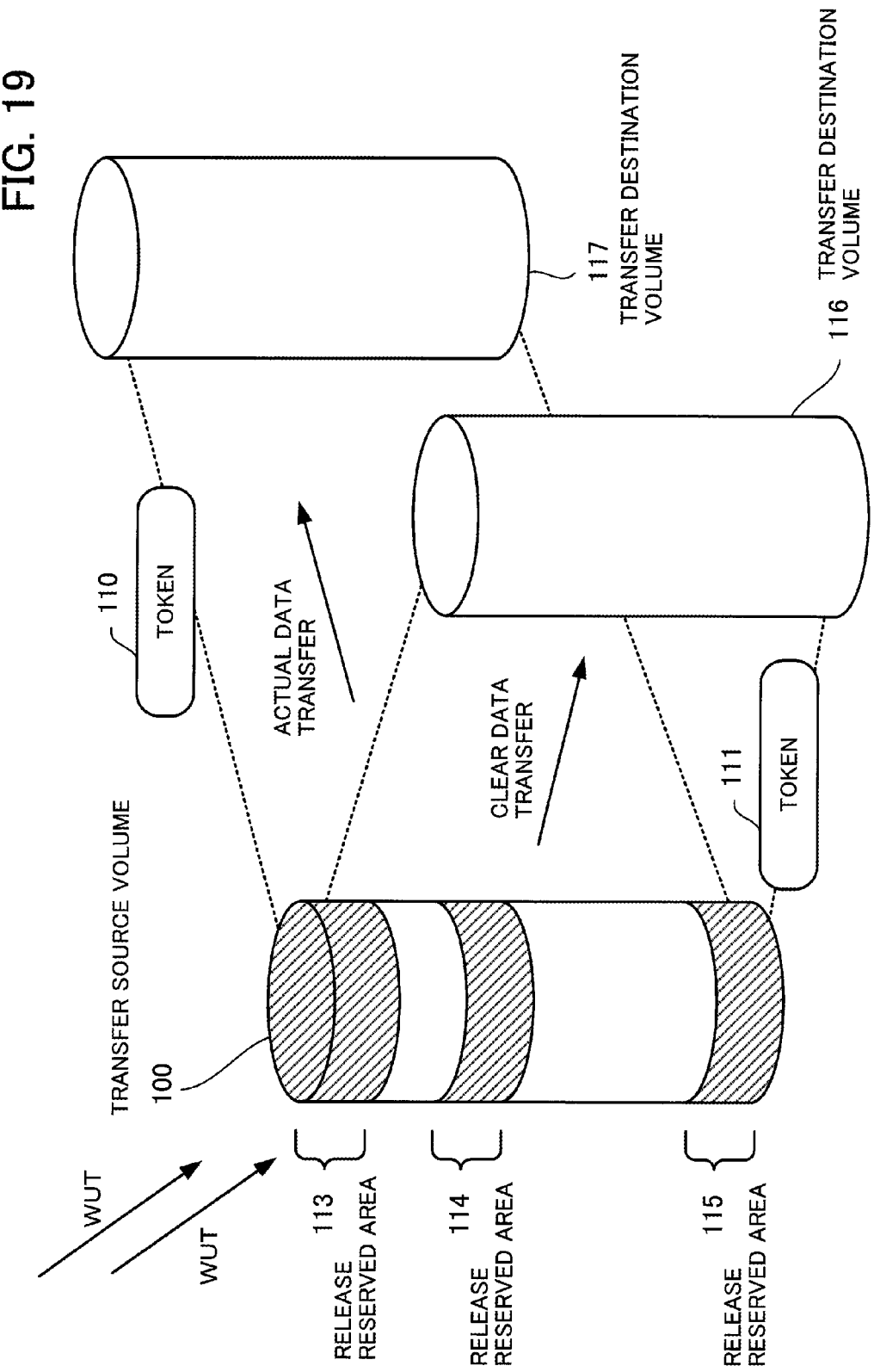
FIG. 19 illustrates an example of copying data in the case where a "PT" command is issued before and after issuance of an "UNMAP" command.

In this way, the storage apparatus 20 may perform data transfer illustrated in FIG. 19. In the above description, for ease of explanation, it is assumed that the storage apparatus 20 performs the WUT command responding process. However, the WUT command responding process is actually performed by the corresponding controller module 21 of the storage apparatus 20.

The above-described processing functions may be implemented on a computer. In this case, a program is provided that describes operations of the functions of the information processing apparatus 1 (including the controller 3), the storage apparatus 20, the controller module 21, and the like. When the program is executed by the computer, the above-described processing functions are implemented on the computer. The program may be stored in a computer-readable recording medium. Examples of computer-readable recording media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include DVD, DVD-RAM, CD-ROM, CD-RW, and the like. Examples of magneto-optical storage media include magneto-optical disk (MO) and the like.

For distribution of the program, portable storage media, such as DVD, CD-ROM, and the like, storing the program may be sold, for example. Further, the program may be stored in a storage device of a server computer so as to be transmitted from the server computer to other computers via a network.

A computer which is to execute the program stores, in its storage device, the program recorded on a portable storage medium or the program transmitted from a server computer. Then, the computer reads the program from its storage device, and executes processing in accordance with the program. Note that the computer may read the program directly from the portable storage medium so as to execute processing in accordance with the program. Alternatively, the computer may sequentially receive the program from a server computer connected over a network, and perform processing in accordance with the received program.

The above-described processing functions may also be implemented wholly or partly by using electronic circuits such as DSP, ASIC, PLD, and the like.

An information processing apparatus and an area release control method according to an aspect improve the memory use efficiency at the time of area release while executing an offload data transfer function.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. An information processing apparatus comprising:
    a memory configured to store a received offload data transfer instruction; and one or more processors configured to perform a procedure including:
  generating transfer source information regarding a transfer source area in accordance with the offload data transfer instruction,
  setting, when a release instruction to release an area overlapping the transfer source area is received, the area to a reserved state so as to reserve release of the area, after issuing a completion response for the release instruction,
  determining a pending state in which data transfer using the transfer source information is pending, and
  releasing the area in the reserved state, when the pending state is cancelled.

2. The information processing apparatus according to claim 1, wherein the procedure further includes cancelling the pending state, when updating information in the area in the reserved state.

3. The information processing apparatus according to claim 2, wherein the procedure further includes cancelling the pending state, when a Write I/O is issued for the area in the reserved state.

4. The information processing apparatus according to claim 1, wherein the procedure further includes cancelling the pending state, when the transfer source information becomes invalid.

5. The information processing apparatus according to claim 4, wherein the procedure further includes invalidating the transfer source information, when a validity period set for the transfer source information ends.

6. The information processing apparatus according to claim 1, wherein the procedure further includes transferring data stored in the transfer source area, in accordance with a transfer instruction based on the transfer source information, when the release instruction is received after generation of the transfer source information.

7. The information processing apparatus according to claim 6, wherein the procedure further includes transferring clear data in accordance with a transfer instruction based on the transfer source information, when the release instruction is received before generation of the transfer source information.

8. The information processing apparatus according to claim 7, wherein the procedure further includes holding sequential relationship information in the memory, the sequential relationship information indicating a sequential relationship between the release instruction and generation of the transfer source information.

9. The information processing apparatus according to claim 8, wherein the procedure further includes holding sequential relationship information for each transfer source volume that includes the transfer source area.

10. The information processing apparatus according to claim 1, wherein the procedure further includes creating, when part or all of data in the transfer source area is updated, a saving reserved state so as to reserve saving of the data to a saving area, and when a predetermined condition is satisfied, cancelling the reserved state and releasing the area and, at the same time, cancelling the saving reserved state without saving the data to the saving area.

11. A non-transitory computer-readable storage medium storing a computer program, the computer program causing a computer to perform a procedure comprising:
  generating transfer source information regarding a transfer source area, upon reception of an offload data transfer instruction;
  setting, when a release instruction to release an area overlapping the transfer source area is received, the area to a reserved state so as to reserve release of the area, after issuing a completion response for the release instruction;
  determining a pending state in which data transfer using the transfer source information is pending; and
  releasing the area in the reserved state, when the pending state is cancelled.

12. An area release control method comprising:
  generating, by a processor, transfer source information regarding a transfer source area, upon reception of an offload data transfer instruction;
  setting, by the processor, when a release instruction to release an area overlapping the transfer source area is received, the area to a reserved state so as to reserve release of the area, after issuing a completion response for the release instruction;
  determining, by the processor, a pending state in which data transfer using the transfer source information is pending; and
  releasing, by the processor, the area in the reserved state, when the pending state is cancelled.

* * * * *